(12) United States Patent
Watanabe et al.

(10) Patent No.: US 8,213,352 B2
(45) Date of Patent: Jul. 3, 2012

(54) WIRELESS COMMUNICATION SYSTEM, WIRELESS COMMUNICATION DEVICE, WIRELESS COMMUNICATION METHOD, AND PROGRAM

(75) Inventors: Kazuhiro Watanabe, Kanagawa (JP); Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 12/521,011

(22) PCT Filed: Nov. 30, 2007

(86) PCT No.: PCT/JP2007/073196
§ 371 (c)(1),
(2), (4) Date: Jun. 24, 2009

(87) PCT Pub. No.: WO2008/078507
PCT Pub. Date: Jul. 3, 2008

(65) Prior Publication Data
US 2010/0020740 A1 Jan. 28, 2010

(30) Foreign Application Priority Data
Dec. 26, 2006 (JP) ................................ P2006-349561

(51) Int. Cl.
*H04B 7/14* (2006.01)

(52) U.S. Cl. .......................... 370/315; 370/241; 370/252

(58) Field of Classification Search .................. 370/241, 370/252, 310, 315; 375/211–255; 455/7–25; 709/227–244
See application file for complete search history.

(56) References Cited

U.S. PATENT DOCUMENTS

| 2005/0160179 A1* | 7/2005 | Retana et al. ................. 709/238 |
| 2006/0256741 A1 | 11/2006 | Nozaki |
| 2007/0070983 A1* | 3/2007 | Redi et al. ..................... 370/352 |
| 2010/0014444 A1* | 1/2010 | Ghanadan et al. ............ 370/310 |

FOREIGN PATENT DOCUMENTS

| JP | 2003-249937 | 9/2003 |
| JP | 2006-319676 | 11/2006 |

OTHER PUBLICATIONS

Clausen et al, Optimized Link State Routing Protocol, (OLSR), Network Working Group, Oct. 2003.*
T. Clausen et al., "Optimized Link State Routing Protocol (OSSR)", RFC 3626, Network Working Group, IETF (http://www.ieft.org.rfc/rfc3626.txt) (2003).

\* cited by examiner

*Primary Examiner* — Hassan Kizou
*Assistant Examiner* — Charles C Jiang
(74) *Attorney, Agent, or Firm* — Finnegan, Henderson, Farabow, Garrett & Dunner, L.L.P.

(57) ABSTRACT

A set-N table (110) is a table holding information regarding other wireless communication devices that can be reached from a wireless communication device (a node) in one hop. A set-$N^2$ table (120) is a table holding information regarding other wireless communication devices that can be reached from a wireless communication device (100) in two hops. A set-F table (170) is a table holding information regarding nodes whose reachability of flooding from the wireless communication device (100) has not been verified. An MPR setting unit (160) sets optimal MPR nodes with consideration of communication states of links in a wireless ad hoc network by selecting, with consideration of communication states of links between individual nodes, the communication states of links being held in the set-N table (110) and the set-$N^2$ table (120), MPR nodes and setting the MPR nodes in an MPR table (180) while deleting nodes whose reachability of flooding has been verified from the set-F table (170).

12 Claims, 25 Drawing Sheets

FIG. 17
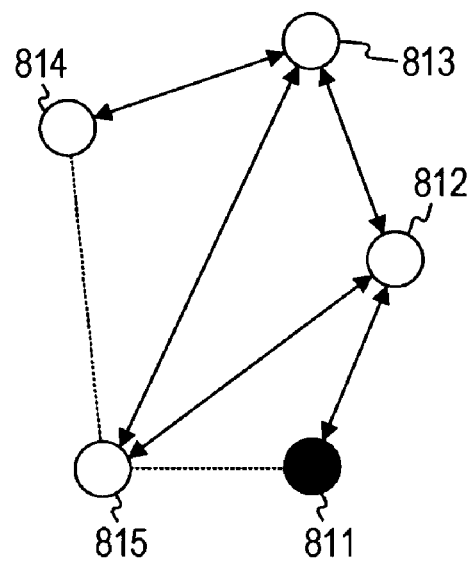
(a)
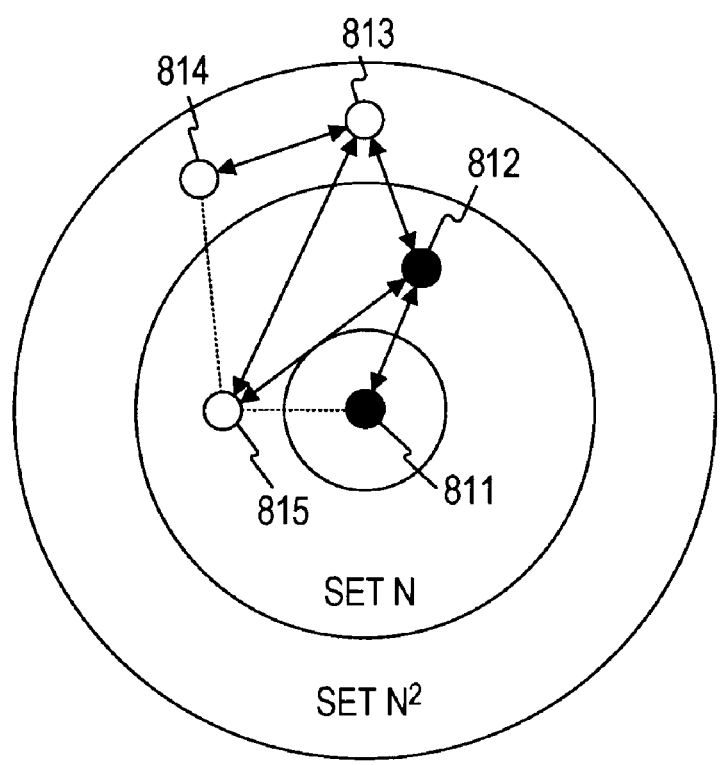
(b)

FIG. 18
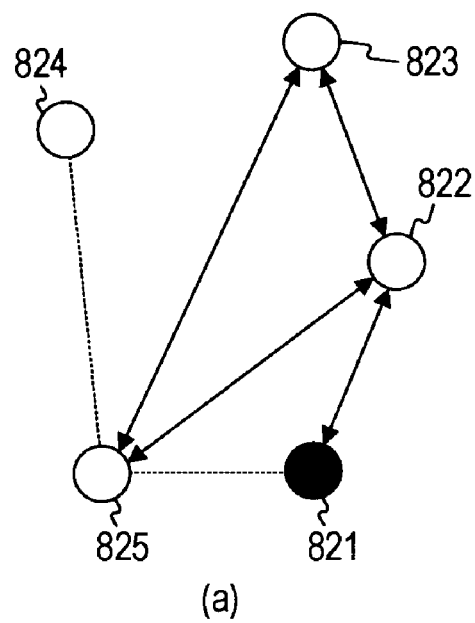
(a)
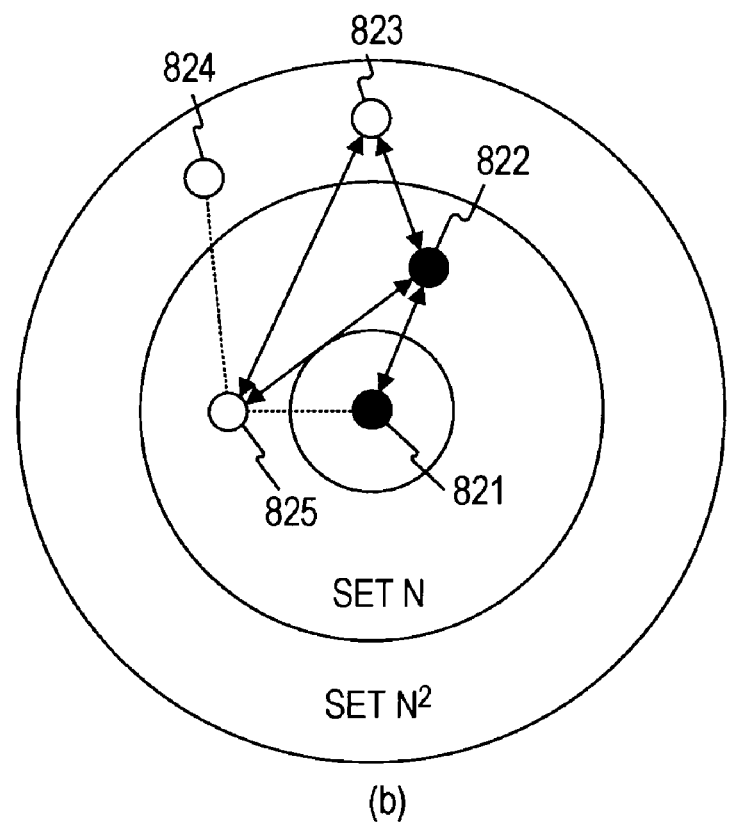
(b)

FIG. 19
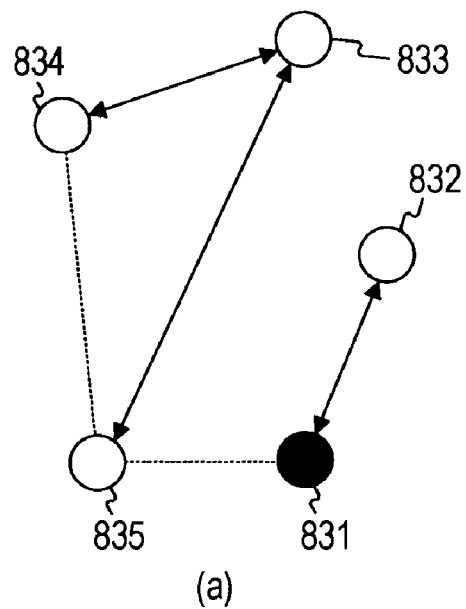
(a)
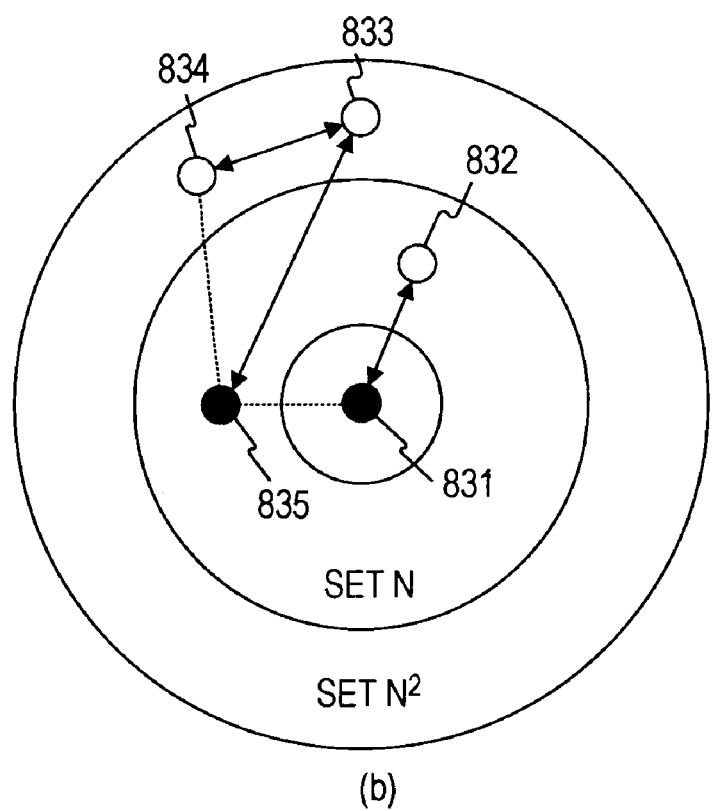
(b)

WIRELESS COMMUNICATION SYSTEM, WIRELESS COMMUNICATION DEVICE, WIRELESS COMMUNICATION METHOD, AND PROGRAM

TECHNICAL FIELD

The present invention relates to a wireless communication system, and more particularly to a wireless communication system that relays frames between wireless communication devices, a wireless communication device in this system, a processing method performed in this system and this device, and a program that causes a computer to execute the method.

BACKGROUND ART

Electronic appliances have become smaller and more sophisticated and can be easily carried around. Thus, there is a demand for an environment in which a wireless communication device (a node) can be connected to a network when necessary and communication is enabled. As such an environment, a network temporarily created as necessary, that is, a wireless ad hoc network technology is being developed. In this wireless ad hoc network, without setting specific access points, individual wireless communication devices (for example, computers, portable information terminals (PDA: Personal Digital Assistance), portable telephones, and the like) which are autonomously distributed are connected by relaying frames to one another.

In this wireless ad hoc network, broadcast signals such as broadcast packets are sequentially sent via other wireless communication devices. Such sending of signals is called flooding (flooding). In the case of such flooding, when each node simply rebroadcasts broadcast packets that have not been previously received, if the number of nodes on a network increases, the number of broadcast packets on the network increases. As a result, a problem occurs in that flooding increases the network load.

Moreover, in general, broadcast packets are not retransmitted. Thus, when the number of broadcast packets increases within a network, packet loss due to collision increases in a case of CSMA/CA, which is a common wireless network access method. As a result, the reliability of flooding significantly decreases. Thus, for a wireless ad hoc network, there is a demand for an effective flooding method that prevents the number of broadcast packets from exponentially increasing when the number of nodes increases within the network.

At present, a technology called MPR (Multi Point Relay) is known as an effective flooding method for wireless ad hoc networks. This MPR technology is a method that is also employed as a flooding technology in OLSR (Optimized Link State Routing, RFC3626), which is a proactive routing protocol employed by the IETF (Internet Engineering Task Force) MANET WG (Mobile Ad-Hoc Network Working Group) (For example, see T. Clausen et al.: "Optimized Link State Routing Protocol (OLSR)", RFC 3626, Network Working Group, IETF (http://www.ietf.org/rfc/rfc3626.txt).

MPR is a technology for "effectively" flooding all nodes existing on a network with broadcast packets. Here, "effectively" means that, without all nodes rebroadcasting broadcast packets, the number of nodes that are allowed to rebroadcast is limited in accordance with a network status, whereby the number of broadcast packets to be transmitted to a network is reduced. First, each node selects and sets a node called an "MPR node" from among neighbor nodes. Then, the node sends a notification of information regarding the MPR node to neighbor nodes. A node selected as an MPR node rebroadcasts broadcast packets that are transmitted from nodes that set the node as an MPR node. Thus, flooding can be executed without all nodes rebroadcasting broadcast packets. That is, in an MPR technology, how to select MPR nodes is important.

However, in an actual wireless ad hoc network, communication states of links between all neighbor nodes may not be two-way stable states on every occasion, and there may be an unstable-state link in which packet error often occurs. There is a high probability that a link in which packet error often occurs may be temporarily determined as a one-way link. Thus, in a case where flooding using MPR nodes is applied, flooding may not be performed for nodes whose link state is unstable. With consideration of wireless propagation paths, the probability is sufficiently high that packet errors occur in a burst manner, thus it is necessary to attempt flooding even for nodes having a link whose communication state is unstable; however, the present MPR technology is not entirely appropriate therefor.

Thus, an object of the present invention is to set optimal MPR nodes with consideration of communication states of links in a wireless ad hoc network.

The present invention has been made to solve the above-described problems. A first aspect of the present invention is a wireless communication device that performs communication, in a route via a neighbor wireless communication device, with another wireless communication device that exists outside a wireless communication range of the wireless communication device, characterized by including: unidentified-device identification-information holding means for holding, as unidentified-device identification information, information used to identify an unidentified device that is another wireless communication device to which the reachability of a signal whose transmission source is the wireless communication device has not been verified; relay-device identification-information holding means for holding information used to identify a relay device that is another wireless communication device that relays a signal whose transmission source is the wireless communication device; and relay-device setting means for treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, holding information used to identify the selected relay device in the relay-device identification-information holding means, and deleting information used to identify a wireless communication device whose reachability has been verified via the selected relay device from the unidentified-device identification-information holding means, until the unidentified-device identification information held in the unidentified-device identification-information holding means becomes nonexistent. Thus, it becomes possible for a relay device to be selected in accordance with a communication state between wireless communication devices.

Moreover, in this first aspect, in a case where a specific second destination station having only one link to one of the first destination stations exists in the second destination stations whose unidentified-device identification information is held in the unidentified-device identification-information holding means, if both a communication state between the specific first destination station and the wireless communication device and a communication state between the specific first destination station and the specific second destination station are stable states, the relay-device setting means may select the specific first destination address as the relay device. Thus, in a case where there exists a specific second destination station having only one link to one of first destination stations, it becomes possible for a relay device to be selected in such a manner that relaying is preferentially performed to such a second destination station. Moreover, in this case, when at least either a communication state between the specific first destination station and the wireless communication device or a communication state between the specific first station and the specific second destination station is an unstable state, if there exists a first destination station which is other than the specific first destination station and whose communication state with the wireless communication device is a stable state, the relay-device setting means may select such a first destination station as the relay device, and if such a first destination station does not exist, the relay-device setting means may select the specific first destination station as the relay device. Thus, if a communication state of a route via a first destination station other than a specific first destination station is stable, it becomes possible for a relay device to be selected in such a manner that such a route is prioritized.

Moreover, in this first aspect, in a case where no specific second destination station having only one link to one of the first destination stations exists in the second destination stations whose unidentified-device identification information is held in the unidentified-device identification-information holding means, the relay-device setting means may select a first destination station that is more stable and that has a large number of links as the relay device, in accordance with communication states and the number of links between the second destination stations whose unidentified-device identification information is held in the unidentified-device identification-information holding means and the first destination stations and communication states between the first destination stations and the wireless communication device. Thus, in a case where there exists no second destination station having only one link to one of first destination stations, it becomes possible for a relay device that can perform stable relaying to more number of second destination stations, to be selected.

Moreover, a second aspect of the present invention is a wireless communication device that performs communication, in a route via a neighbor wireless communication device, with another wireless communication device that exists outside a wireless communication range of the wireless communication device, characterized by including: unidentified-device identification-information holding means for holding, as unidentified-device identification information, information used to identify an unidentified device that is another wireless communication device that exists within a wireless communication range to which the reachability of a signal whose transmission source is the wireless communication device has not been verified; relay-device identification-information holding means for holding information used to identify a relay device that is another wireless communication device that relays a signal whose transmission source is the wireless communication device; and relay-device setting means for selecting the relay device in accordance with a communication state between the wireless communication device and the other wireless communication device, holding information used to identify the selected relay device in the relay-device identification-information holding means, and deleting information used to identify a wireless communication device whose reachability has been verified via the selected relay device from the unidentified-device identification-information holding means, until the unidentified-device identification information held in the unidentified-device identification-information holding means becomes nonexistent. Thus, it becomes possible for a relay device to be selected in accordance with a communication state with another wireless communication device that exists within a wireless communication range.

Moreover, in this second aspect, in a case where there exists the other wireless communication device whose communication state with the unidentified device whose unidentified-device identification information is held in the unidentified-device identification-information holding means is a stable state, the relay-device setting means may select the other wireless communication device as the relay device. Thus, if a communication state between an unidentified device that exists within a wireless communication range and another wireless communication device that exists within the wireless communication range is a stable state, it becomes possible for such another wireless communication device to be selected as a relay device.

Moreover, a third aspect of the present invention is a wireless communication system in which wireless communication devices each perform communication, in a route via a neighbor wireless communication device, with another wireless communication device that exists outside a wireless communication range of the wireless communication device, characterized by including: each of the wireless communication devices including unidentified-device identification-information holding means for holding, as unidentified-device identification information, information used to identify an unidentified device that is another wireless communication device to which the reachability of a signal whose transmission source is the wireless communication device has not been verified; relay-device identification-information holding means for holding information used to identify a relay device that is another wireless communication device that relays a signal whose transmission source is the wireless communication device; and relay-device setting means for treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, holding information used to identify the selected relay device in the relay-device identification-information holding means, and deleting information used to identify a wireless communication device whose reachability has been verified via the selected relay device from the unidentified-device identification-information holding means, until the unidentified-device identification information held in the unidentified-device identification-information holding means becomes nonexistent. Thus, it becomes possible for a relay device to be selected in accordance with a communication state between wireless communication devices in a wireless communication system.

Moreover, a fourth aspect of the present invention is a wireless communication system in which wireless communication devices each perform communication, in a route via a neighbor wireless communication device, with another wireless communication device that exists outside a wireless communication range of the wireless communication device, characterized by including: each of the wireless communication devices including unidentified-device identification-information holding means for holding, as unidentified-device identification information, information used to identify an unidentified device that is another wireless communication device that exists within a wireless communication range to which the reachability of a signal whose transmission source is the wireless communication device has not been verified; relay-device identification-information holding means for holding information used to identify a relay device that is another wireless communication device that relays a signal whose transmission source is the wireless communication device; and relay-device setting means for selecting the relay device in accordance with a communication state between the wireless communication device and the other wireless communication device, holding information used to identify the selected relay device in the relay-device identification-information holding means, and deleting information used to identify a wireless communication device whose reachability has been verified via the selected relay device from the unidentified-device identification-information holding means, until the unidentified-device identification information held in the unidentified-device identification-information holding means becomes nonexistent. Thus, it becomes possible for a relay device to be selected in accordance with a communication state with another wireless communication device that exists within a wireless communication range.

Moreover, a fifth aspect of the present invention is a wireless communication method in a wireless communication device that is one of wireless communication devices each performing communication, in a route via a neighbor wireless communication device, with another wireless communication device that exists outside a wireless communication range of the wireless communication device and including unidentified-device identification-information holding means for holding, as unidentified-device identification information, information used to identify an unidentified device that is another wireless communication device to which the reachability of a signal whose transmission source is the wireless communication device has not been verified and relay-device identification-information holding means for holding information used to identify a relay device that is another wireless communication device that relays a signal whose transmission source is the wireless communication device, characterized by including: a selection process of treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, and holding information used to identify the selected relay device in the relay-device identification-information holding means; and a deletion process of deleting information used to identify a wireless communication device whose reachability has been verified via the selected relay device from the unidentified-device identification-information holding means, wherein the selection process and the deletion process are repeated until the unidentified-device identification information held in the unidentified-device identification-information holding means becomes nonexistent, or a program characterized by causing a computer to repeatedly execute these processes until the unidentified-device identification information held in the unidentified-device identification-information holding means becomes nonexistent. Thus, it becomes possible for a relay device to be selected in accordance with a communication state between wireless communication devices.

Moreover, a sixth aspect of the present invention is a wireless communication method in a wireless communication device that is one of wireless communication devices each performing communication, in a route via a neighbor wireless communication device, with another wireless communication device that exists outside a wireless communication range of the wireless communication device and including unidentified-device identification-information holding means for holding, as unidentified-device identification information, information used to identify an unidentified device that is another wireless communication device to which the reachability of a signal whose transmission source is the wireless communication device has not been verified and relay-device identification-information holding means for holding information used to identify a relay device that is another wireless communication device that relays a signal whose transmission source is the wireless communication device, characterized by including: a selection process of selecting the relay device in accordance with a communication state between the wireless communication device and the other wireless communication device and holding information used to identify the selected relay device in the relay-device identification-information holding means; and a deletion process of deleting information used to identify a wireless communication device whose reachability has been verified via the selected relay device from the unidentified-device identification-information holding means, wherein the selection process and the deletion process are repeated until the unidentified-device identification information held in the unidentified-device identification-information holding means becomes nonexistent, or a program characterized by causing a computer to repeatedly execute these processes until the unidentified-device identification information held in the unidentified-device identification-information holding means becomes nonexistent. Thus, it becomes possible for a relay device to be selected in accordance with a communication state with another wireless communication device that exists within a wireless communication range.

According to the present invention, a superior effect of being capable of setting optimal MPR nodes with consideration of communication states of links can be obtained in a wireless ad hoc network.

BRIEF DESCRIPTION OF DRAWINGS

FIG. 17 includes diagrams showing a first specific example according to an embodiment of the present invention.

FIG. 18 includes diagrams showing a second specific example according to the embodiment of the present invention.

FIG. 19 includes diagrams showing a third specific example according to the embodiment of the present invention.

BEST MODES FOR CARRYING OUT THE INVENTION

Next, embodiments of the present invention will be specifically described with reference to the drawings.

Figure 1:
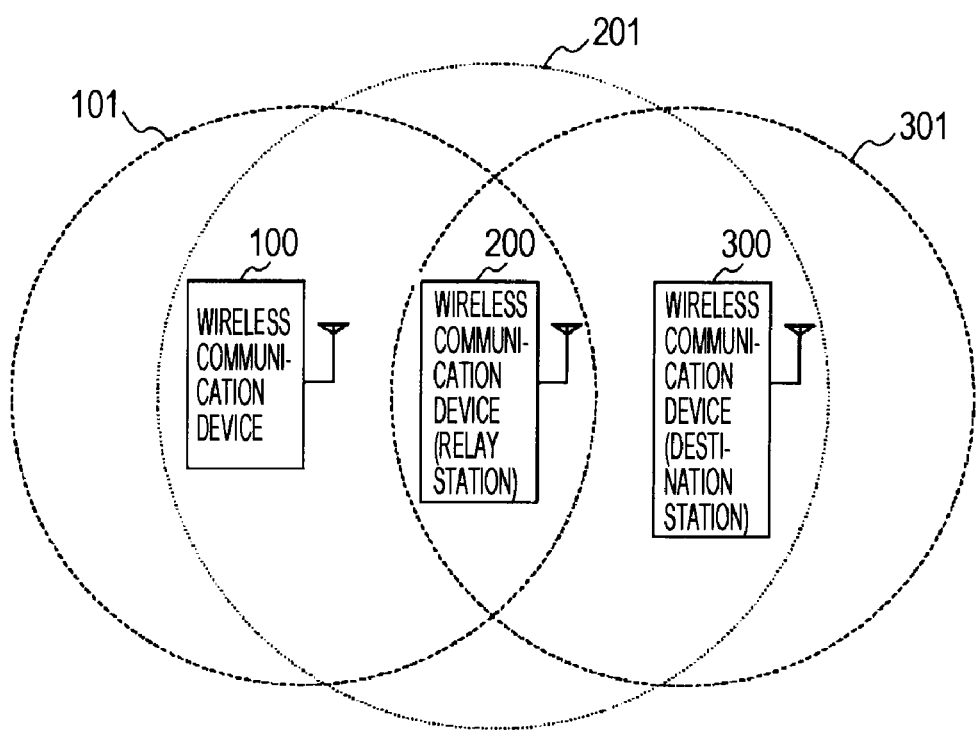
FIG. 1 is a diagram showing an example of a wireless communication system according to an embodiment of the present invention.

FIG. 1 is a diagram showing an example of a wireless communication system according to an embodiment of the present invention. In this wireless communication system, wireless communication devices 100, 200, and 300 constitute a wireless network via wireless communication. Here, the wireless communication devices 100, 200, and 300 each operate in an autonomous distributed manner, and no control station such as an infrastructure network exists.

In this example, in a case where a packet is transmitted from the wireless communication device 100 to the wireless communication device 300, since they are not in each other's communication areas 101 and 301, they cannot directly perform wireless communication. Thus, the wireless communication device 200 which has them within a communication area 201 and which serves as a relay station temporarily receives a packet from the wireless communication device 100 and transmits the packet to the wireless communication device 300, which is a destination station. In this way, in an autonomous distributed wireless network, since another wireless communication device functions as a relay station, communication can be performed with a destination station that is located in the outside of a communication area.

Here, one-to-one connection performed between the wireless communication device 100 and a relay station with which the wireless communication device 100 directly performs communication is called a link. Moreover, a path from the wireless communication device 100 to a destination station via a relay station is called a route.

Note that an example in which one wireless communication device functions as a relay station has been described here; however, the number of relay stations may be two or more. Moreover, in the following, a structure of the wireless communication device 100 will be described as an example; however, as a matter of course, the other wireless communication devices 200 and 300 have a similar structure.

Figure 2:
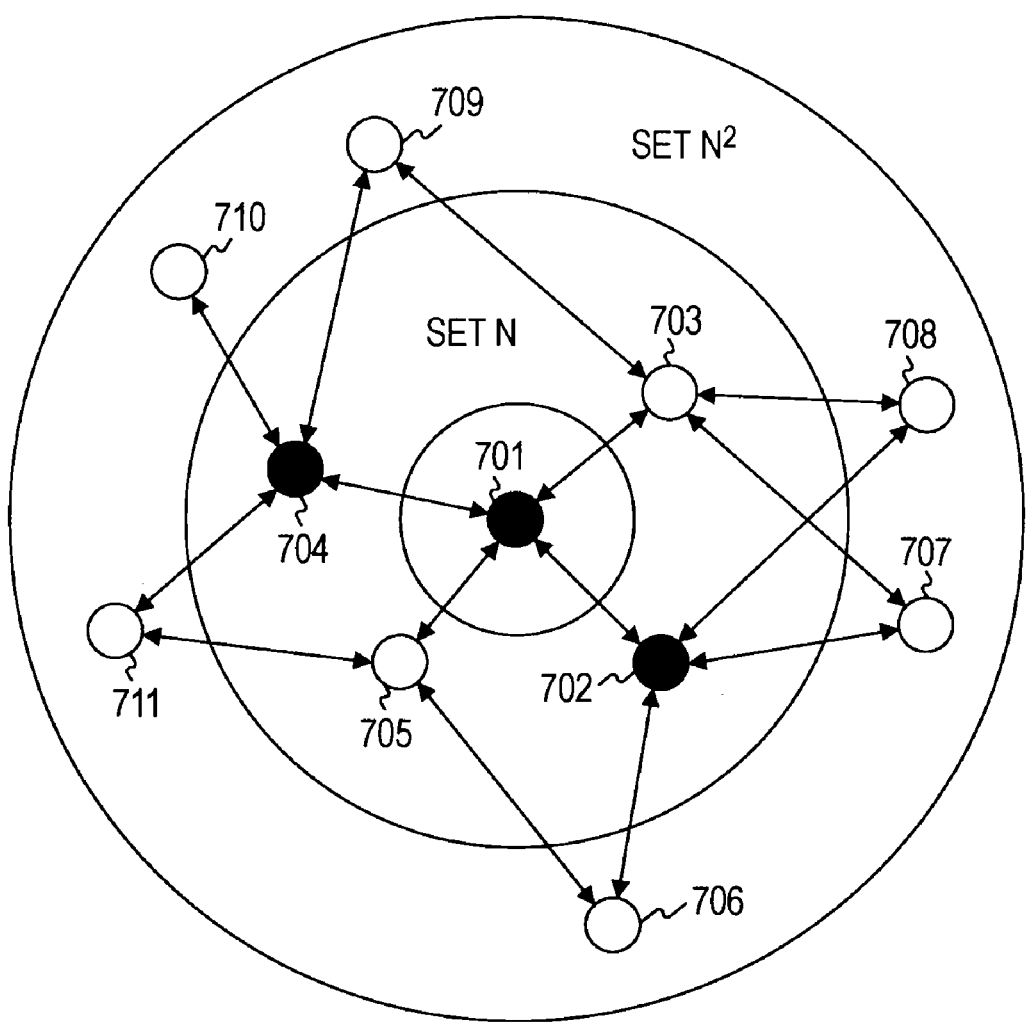
FIG. 2 is a diagram showing relationships between wireless communication devices.

FIG. 2 is a diagram showing relationships between wireless communication devices (nodes). When viewed from a node #A (701) treated as the center, other nodes can be classified into three, a set N, a set $N^2$, and the others.

The set N is a set of neighbor nodes when viewed from the node #A (701) treated as the center. That is, a set of other nodes that exist within a wireless communication area of the node #A (701) is the set N. Thus, the nodes belonging to the set N can be reached from the node #A (701) in one hop. In this example, nodes #B through #E (702 through 705) belong to this set N.

The set $N^2$ is a union of neighbor nodes when viewed from each of the nodes belonging to the set N, the node being treated as the center, the nodes belonging to the set N each being excluded from the union. Thus, the nodes belonging to the set $N^2$ can be reached from the node #A (701) in two hops. In this example, nodes #F through #K (706 through 711) belong to this set $N^2$.

In this diagram, the nodes #B (702) and #D (704) are MPR nodes. That is, when flooding with broadcast packets is performed, the node #B (702) transfers a broadcast packet to the nodes #F through #H (706 through 708) and the node #D (704) transfers a broadcast packet to the nodes #I through #K (709 through 711). Thus, unnecessary transfer is not performed by the node #C (703) or #E (705).

In the embodiment of the present invention, similarly to an existing technology, information regarding neighbor nodes viewed from each node is exchanged with its neighbor nodes utilizing a state notification signal such as a Hello packet in order to obtain the set N and the set $N^2$ at each node. Here, in an existing technology, a node having a two-way link that is stable between nodes is treated as a node belonging to the set N and the information regarding the node is sent as a notification to neighbor nodes; however, in embodiments of the present invention, information regarding all nodes that include not only stable links but also unstable links is sent as a notification to neighbor nodes.

Figure 3:
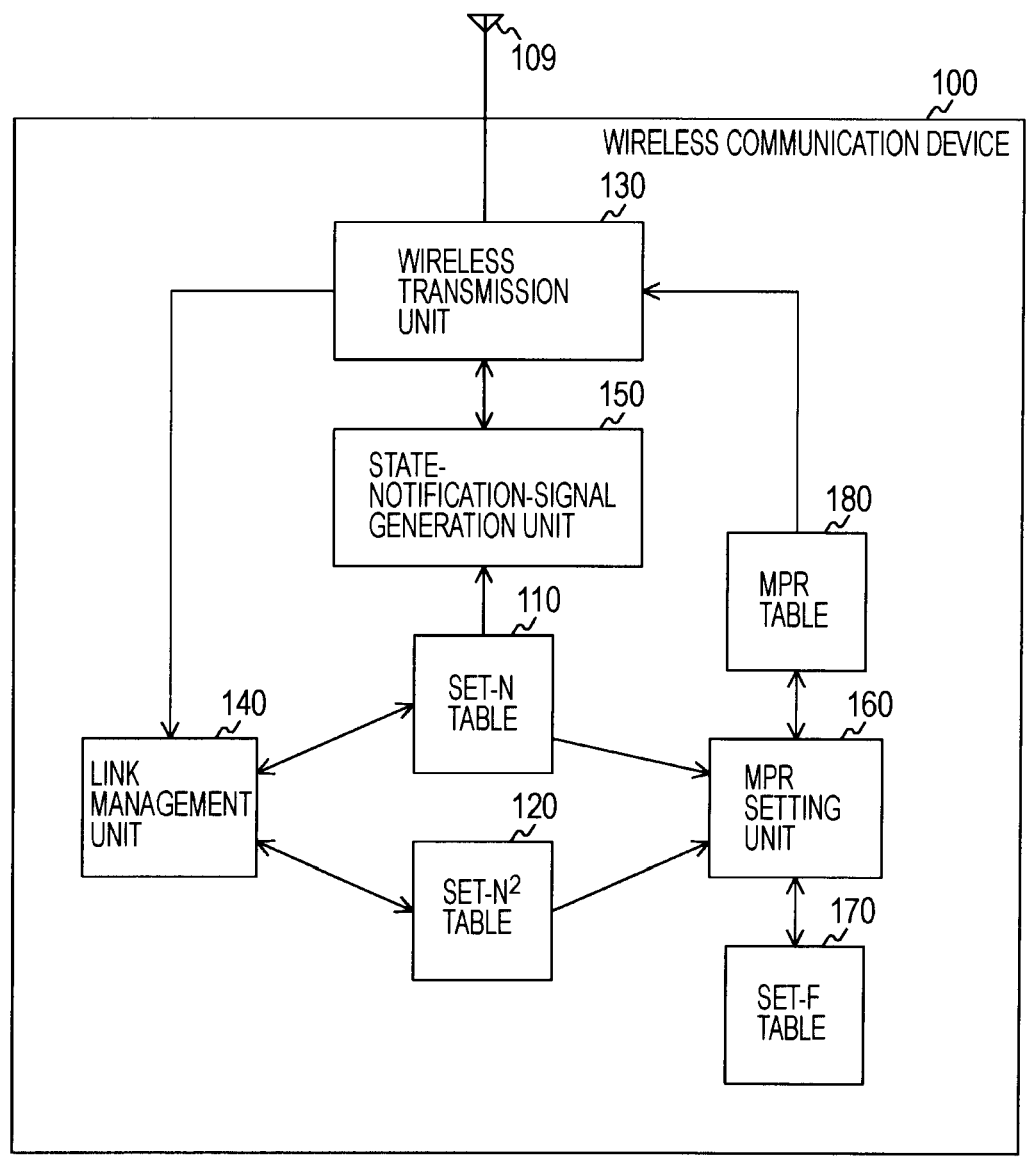
FIG. 3 is a diagram showing an example of a functional structure of a wireless communication device 100 according to the embodiment of the present invention.

FIG. 3 is a diagram showing an example of a functional structure of the wireless communication device 100 according to the embodiment of the present invention. This wireless communication device 100 includes a set-N table 110, a set-$N^2$ table 120, a wireless transmission unit 130, a link management unit 140, a state-notification-signal generation unit 150, an MPR setting unit 160, a set-F table 170, and a MPR table 180.

The set-N table 110 is a table holding information regarding other wireless communication devices belonging to the set N viewed from this wireless communication device 100. The information regarding a wireless communication device includes, for example, a MAC address (Media Access Control address) of the wireless communication device, a MAC address of a neighbor node viewed from the wireless communication device, a communication state of a link between the wireless communication device and the neighbor node (including the wireless communication device 100) viewed from the wireless communication device, and the like. Here, in the embodiment of the present invention, not only when a two-way stable communication state is established but also when the communication state is unstable, every wireless communication device existing within one hop is registered in this set-N table 110.

The set-$N^2$ table 120 is a table holding information regarding other wireless communication devices belonging to the set $N^2$ viewed from this wireless communication device 100. The information regarding a wireless communication device includes, for example, a MAC address of the wireless communication device, a MAC address of a neighbor node viewed from the wireless communication device, a communication state of a link between the wireless communication device and the neighbor node viewed from the wireless communication device, and the like.

The wireless transmission unit 130 is a unit that performs wireless communication to and from other wireless communication devices. An antenna 109 is connected to the wireless transmission unit 130, and wireless communication is performed to and from other wireless communication devices via this antenna 109.

The link management unit 140 is a unit that manages link states by receiving state notification signals such as Hello packets from other wireless communication devices via the wireless transmission unit 130 and updating the content being held in the set-N table 110 and set-$N^2$ table 120 in accordance with the information regarding neighbor nodes included in the state notification signals.

The state-notification-signal generation unit 150 is a unit that generates a state notification signal such as a Hello packet including information regarding other wireless communication devices (that is, neighbor nodes) held in the set-N table 110. This generated state notification signal is transmitted to other wireless communication devices via the wireless transmission unit 130.

The MPR setting unit 160 is a unit that sets an MPR node viewed from this wireless communication device 100 in accordance with information regarding other wireless communication devices and being held in the set-N table 110 and information regarding other wireless communication devices and being held in the set-$N^2$ table 120. The information regarding the set MPR node is held in the MPR table 180. The MPR table 180 holds, for example, a MAC address of an MPR node and the like as information regarding the MPR node.

The set-F table 170 is a work area when an MPR node is set by the MPR setting unit 160. This set-F table 170 holds, as a set F, information regarding nodes whose reachability of flooding has not been verified. Here, the set F means a set of nodes whose reachability of flooding has not been verified. Prior to MPR setting processing, nodes that belong to the set N and have an unstable link state, or nodes that belong to the set $N^2$ are set as the set F. That is, this set-F table 170 holds information regarding nodes having a possibility that broadcast packets transmitted from a source node do not directly reach. Here, there are relationships such that (1) there is a possibility that broadcast packets do not reach any node in an environment in which this set F exists, and on the other hand, (2) in contrast, it is ensured that broadcast packets reach all nodes in an environment in which the set F does not exist.

Thus, the reachability of broadcast packets can be ensured by determining MPR nodes in such a manner that this set becomes nonexistent. Thus, in the embodiment of the present invention, the MPR setting unit 160 successively deletes, from the set-F table 170, nodes whose reachability of flooding from the wireless communication device 100 has been verified in a process of setting MPRs. Then, the MPR setting unit 160 ensures the reachability of broadcast packets to all nodes by repeating processing for setting an MPR node until nodes held in this set-F table 170 become nonexistent, that is, until nodes whose reachability of flooding has not been verified become nonexistent.

Figure 4:
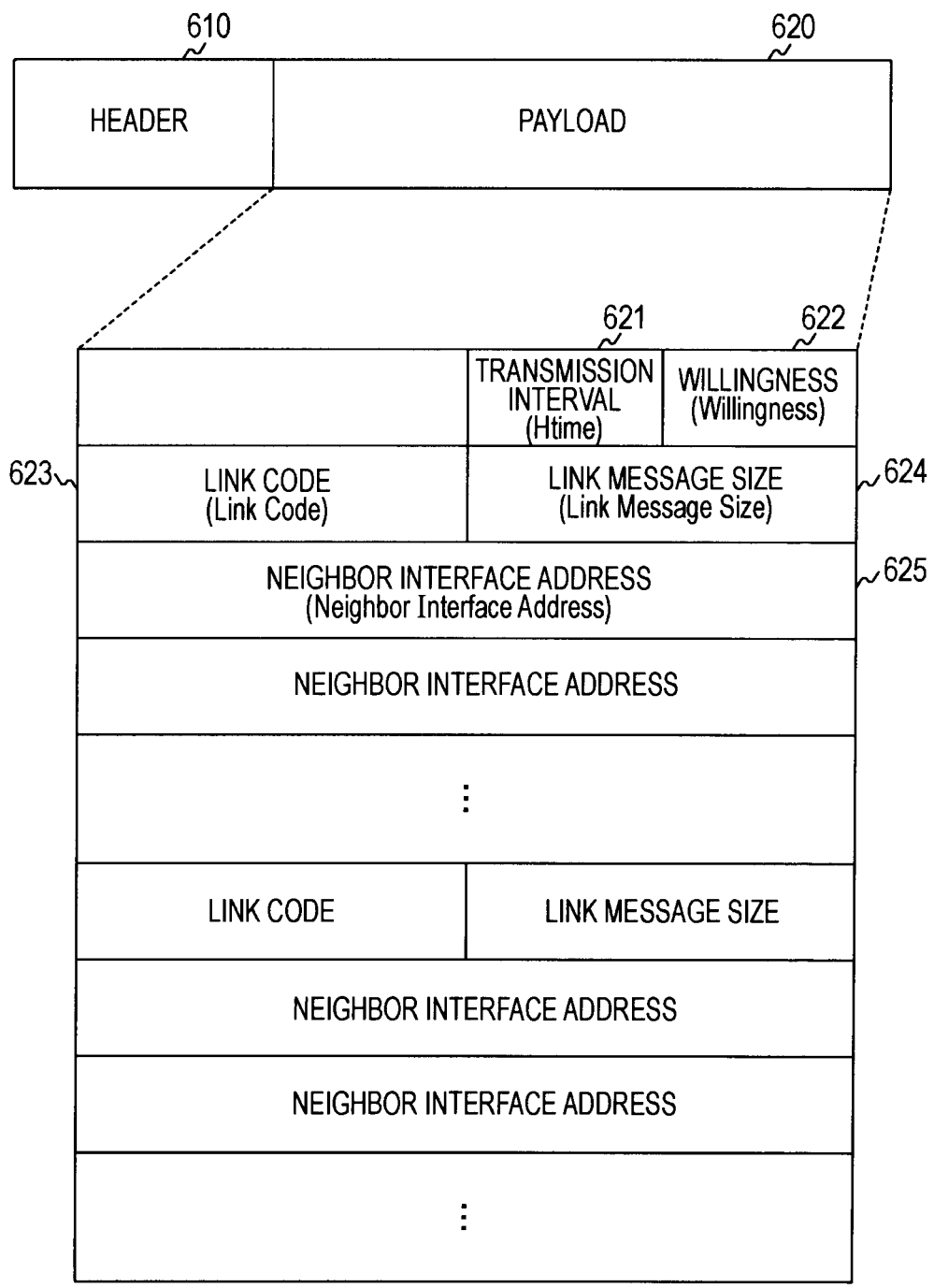
FIG. 4 is a diagram showing a format of a Hello packet which is an example of a state notification signal according to the embodiment of the present invention.

FIG. 4 is a diagram showing a format of a Hello packet, which is an example of a state notification signal according to the embodiment of the present invention. This Hello packet is basically in conformity with the IETF OLSR (Optimized Link State Routing) protocol (RFC3626), and includes a header 610 and a payload 620.

The payload 620 of a Hello packet includes a transmission interval (Htime) 621, a willingness (Willingness) 622, a link code (Link Code) 623, a link message size (Link Message Size) 624, and a neighbor interface address (Neighbor Interface Address) 625.

The transmission interval 621 is a field indicating a transmission interval of Hello packets. The willingness 622 is a field indicating an indicator used when an MPR node for performing transfer to another node is selected.

The link code 623 is a field holding information regarding neighbor nodes. The information regarding neighbor nodes includes, for example, a link type and a neighbor node type. The link type in the link code 623 indicates a link state such as whether links to the neighbor nodes are in a two-way stable state, or in a one-way stable state or in a temporarily unstable state. In OLSR, as a link type, a link direction is sent as a notification. In addition thereto, according to the embodiment of the present invention, information regarding a link state is also sent as a notification. As information regarding a link state, for example, RSSI (Received Signal Strength Indicator), PER (Packet Error Rate), BER (Bit Error Rate), and the like are possible. Moreover, information regarding the physical layer (PHY) such as a transmission rate, information obtained by abstracting such information, and the like are possible.

Moreover, a neighbor node type in the link code 623 indicates a neighbor-node state such as whether neighbor nodes are wirelessly connected via at least one stable link or whether neighbor nodes are selected as MPRs by a transmission source.

The link message size 624 is a field indicating the distance from the above-described link code 623 to the next link code 623 in number of bytes. The number of neighbor interface addresses 625 subsequent to the link message size 624 is indefinite, and thus the size is specified in this link message size 624. The neighbor interface address 625 is a field indicating a neighbor-node address (for example, an MAC address).

In this way, in a Hello packet, for each link code, corresponding neighbor-node addresses are indicated. By Hello packets being transmitted from individual wireless communication devices, other wireless communication devices that receive the Hello packets can update the content held in the set-N table 110 and set-$N^2$ table 120 as necessary. That is, in a case where a Hello packet is received from a neighbor node, the neighbor node is registered in the set-N table 110, assuming that wireless communication is performed with the neighbor node in either a stable link state or an unstable link state. Moreover, when a subject node receives a Hello packet in which a node #A is treated as a neighbor node from a neighbor node of the subject node, if the node #A is not a neighbor node of the subject node, the node #A is registered in the set-$N^2$ table 120.

Next, operation in the wireless communication device 100 according to the embodiment of the present invention will be described with reference to the drawings.

Figure 5:
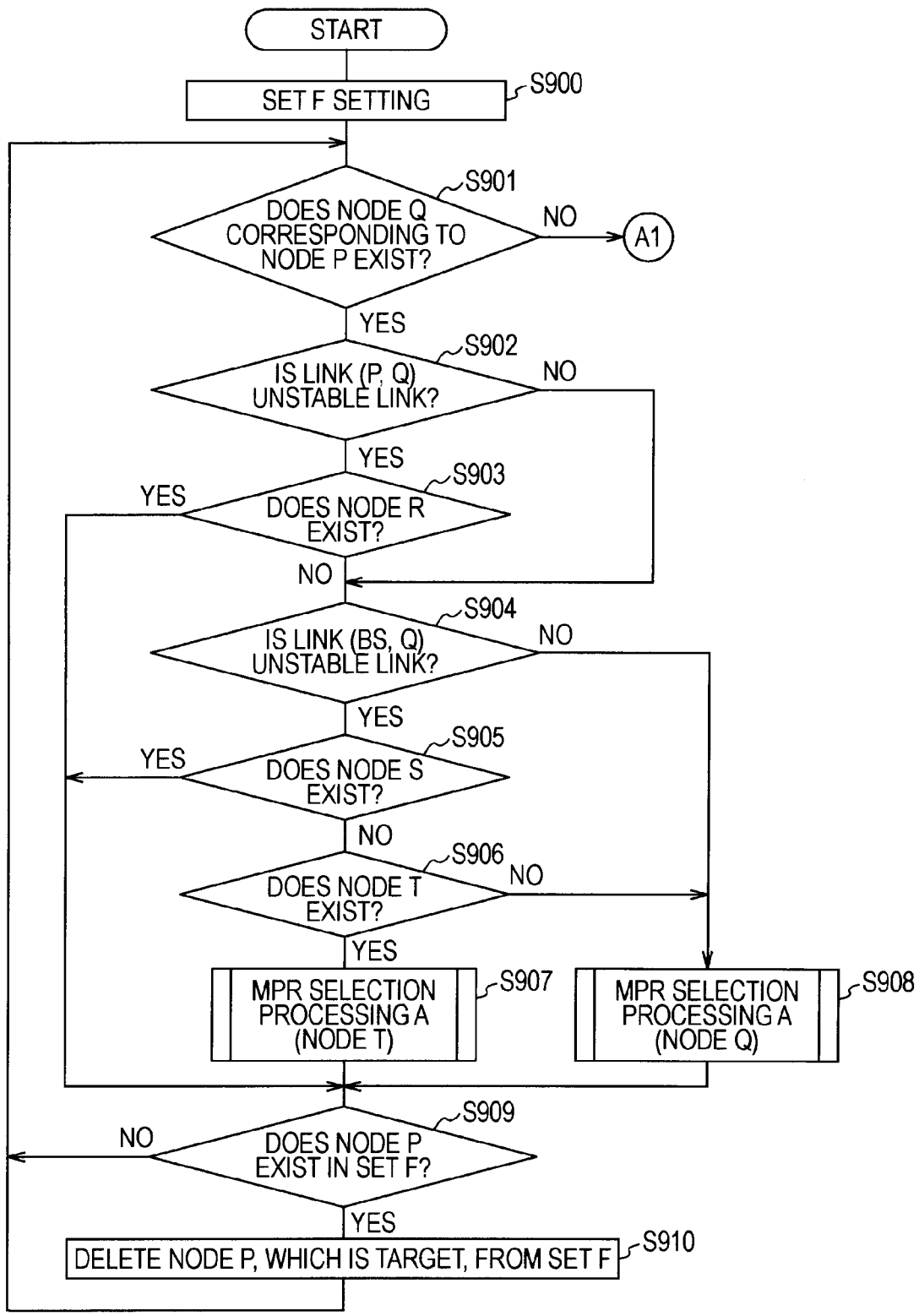
FIG. 5 is a diagram showing an exemplary processing procedure of the first half of MPR setting processing in the wireless communication device 100 according to the embodiment of the present invention.

FIG. 5 is a diagram showing an exemplary processing procedure of the first half of MPR setting processing in the wireless communication device 100 according to the embodiment of the present invention.

In the wireless communication device 100, the MPR setting unit 160 sets information regarding each of "nodes belonging to the set N and having an unstable link state" and "nodes belonging to the set $N^2$" in the set-F table 170 (step S900). The information regarding "nodes belonging to the set N and having an unstable link state" can be obtained from the set-N table 110. Moreover, the information regarding "nodes belonging to the set $N^2$" can be obtained from the set-$N^2$ table 120.

It is assumed that a node having only one link to the nodes belonging to the set N (hereinafter referred to as a "node P") exists in nodes corresponding to "set F ∩ set $N^2$". In this case, in order to make a broadcast packet reach the node P, it is necessary to set, as an MPR, a node having a stable-state link to this node P or a node having a reachability with respect to the node P even though a link to the node P is an unstable-state link. Thus, in the embodiment of the present invention, first, this node is specified, and the node is set as an MPR and the node P is deleted from the set F. Here, in the following description, description will be made on condition that a node belonging to the set N and having a link to the node P is called a node Q. Moreover, the link in this case may be either a stable-state link or an unstable-state link.

Figure 7:
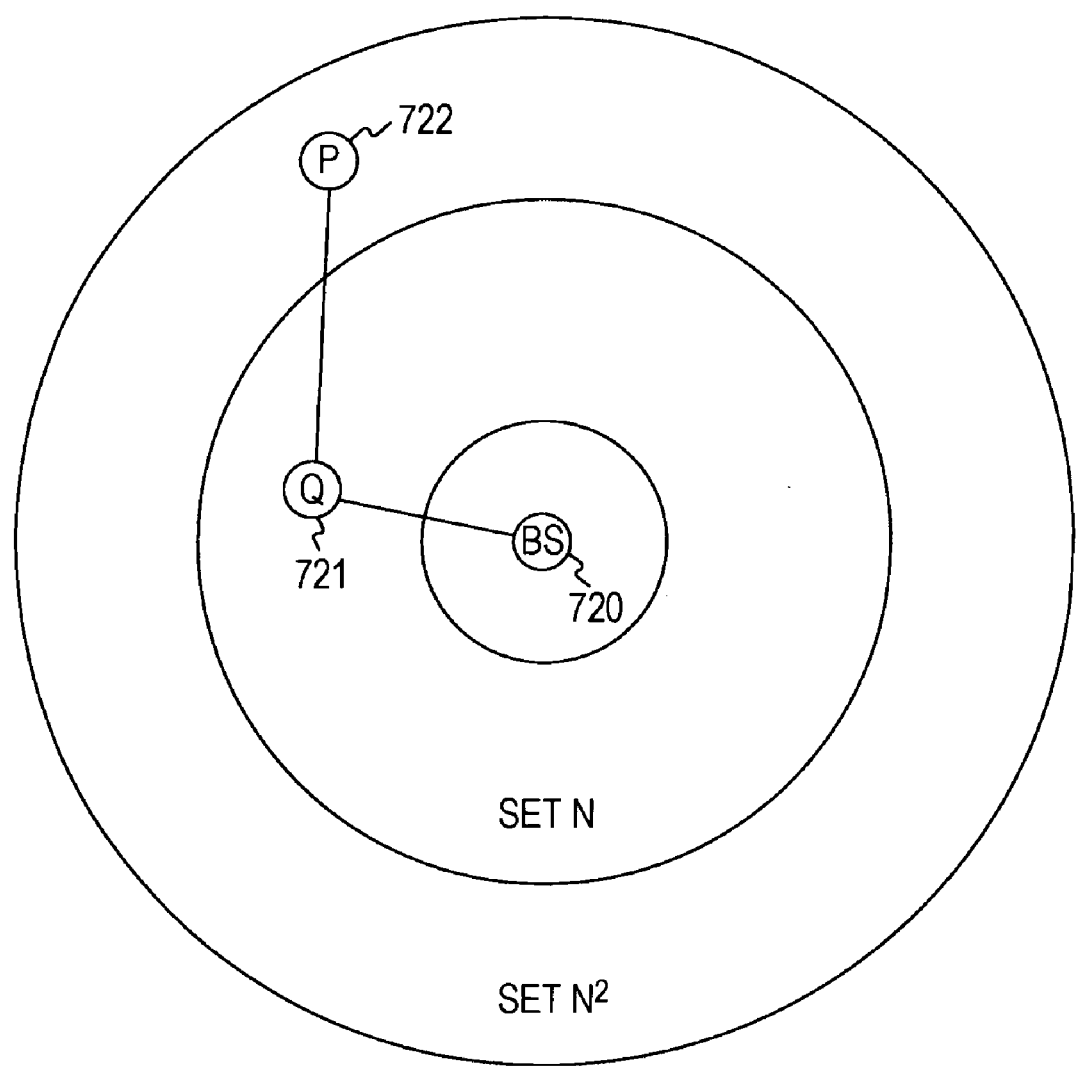
FIG. 7 is a diagram showing a relationship between a node P and a node Q according to the embodiment of the present invention.

FIG. 7 is a diagram showing a relationship between the node P (722) and the node Q (721) like this. From the viewpoint of a node BS (720), the node Q (721) belongs to the set N and the node P (722) belongs to the set $N^2$. A link between the node P (722) and the node Q (721) and a link between the node Q (721) and the node BS (720) have a possibility of being either a stable-state link or an unstable-state link.

If the node Q corresponding to the node P like this exists (step S901), the MPR setting unit 160 performs the following processing. Here, in a case where such a node P does not exist or such a node P becomes nonexistent, the latter half of processing to be described using FIG. 11 will be performed.

First, if the link between the node P and the node Q is a stable-state link (step S902) and the link between the node Q and the node BS is also a stable-state link (step S904), processing for selecting the node Q as an MPR (MPR selection processing A) is performed (step S908).

Figure 6:
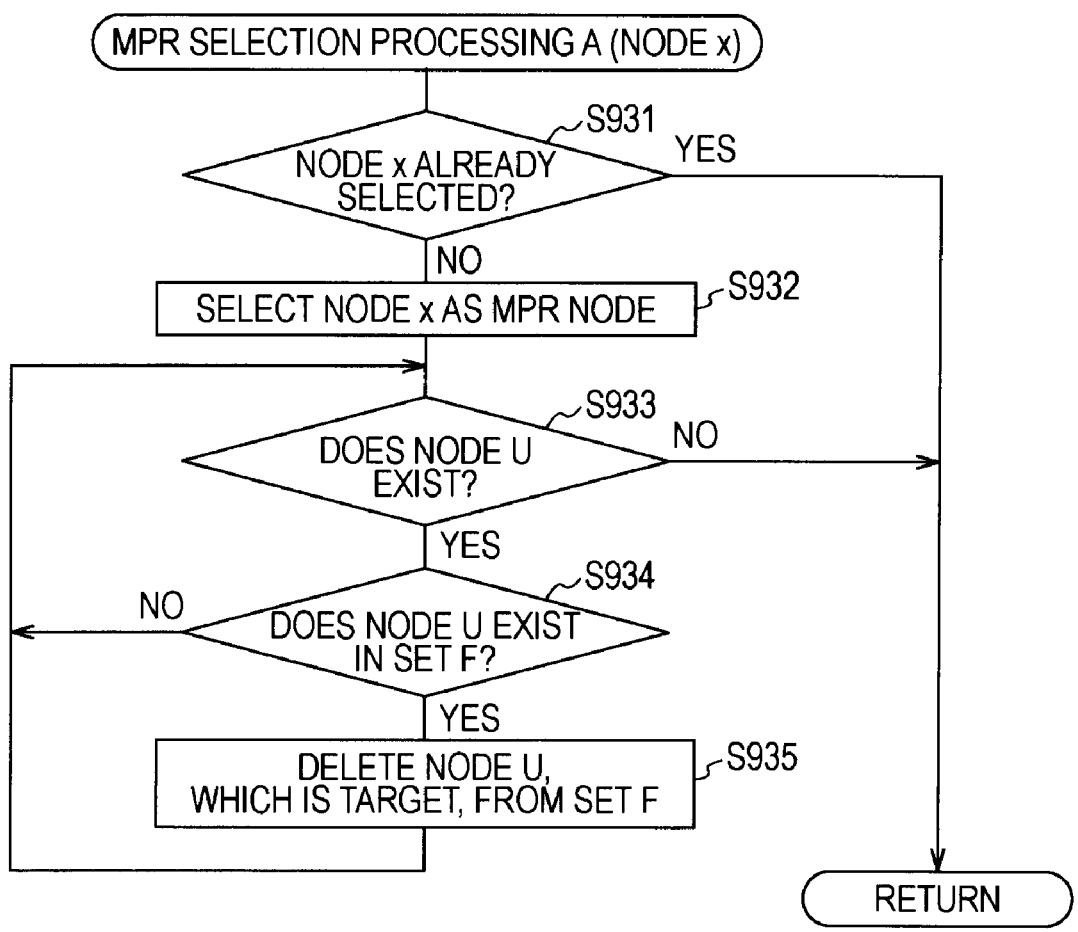
FIG. 6 is a diagram showing an exemplary processing procedure of MPR selection processing A according to the embodiment of the present invention.

FIG. 6 is a diagram showing an exemplary processing procedure of MPR selection processing A according to the embodiment of the present invention. This MPR selection processing A is a subroutine invoked from steps S907 and S908 in FIG. 5 and step S915 in FIG. 11. A parameter used when this invoking is performed is denoted as a "node x". That is, the "node x" represents a "node T" in a case where invoking is performed from step S907 and the "node x" represents the "node Q" in a case where invoking is performed from step S908, and the "node x" represents a "node X1" in a case where invoking is performed from step S915.

In this MPR selection processing A, if the node x has been already selected as an MPR, the procedure returns to the step from which invoking is performed (step S931). If the node x has not been selected as an MPR, the node x is selected as an MPR node and set in the MPR table 180 (step S932). Then, it is determined whether a node (a node U) having a stable-state link to the node x exists in nodes corresponding to "set F ∩ set $N^2$" (step S933). In a case where the node U exists, if the node U has been set in the set-F table 170 (step S934), the node U is deleted from the set-F table 170 (step S935). Since there is a possibility that there are a plurality of nodes U, steps S933 through S935 are repeatedly executed until no node U exists.

Referring back to FIG. 5, if the link between the node P and the node Q is an unstable-state link (step S902), it is determined whether a node (a node R) that belongs to the set $N^2$, has a stable-state link to the node P, and has a stable-state link to a node belonging to the set N exists (step S903).

Figure 8:
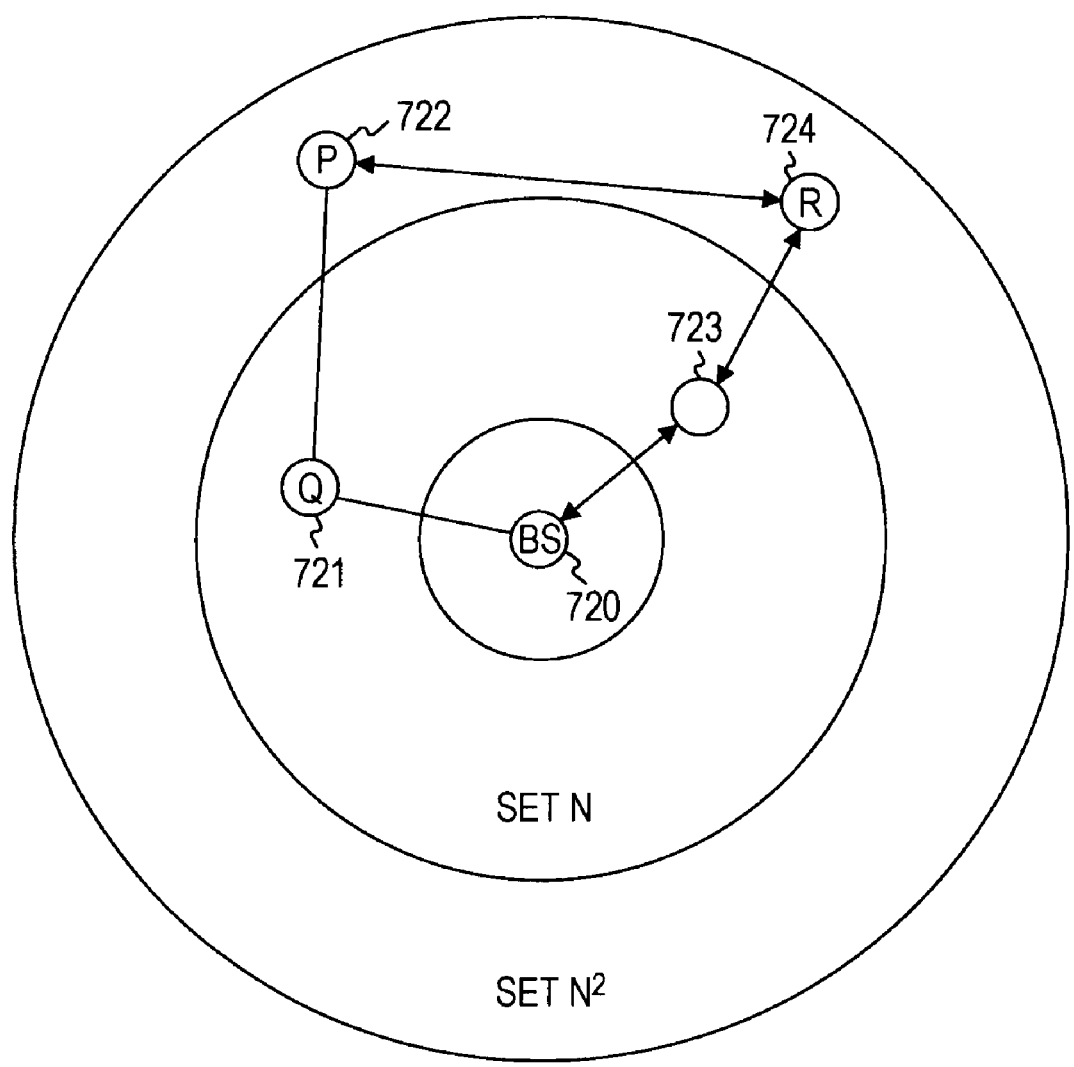
FIG. 8 is a diagram showing relationships between the nodes P and Q and a node R according to the embodiment of the present invention.

FIG. 8 is a diagram showing a node R (724) like this. From the viewpoint of the node BS (720), the node R (724) belongs to the set $N^2$. This node R (724) has a stable-state link to the node BS (720) via another node 723 belonging to the set N (in two hops). Here, in the diagram, a link represented by a double sided arrow means a stable-state link in two ways and a link that is not represented by a double sided arrow means either a stable-state link or an unstable-state link. This is similarly applied to other diagrams.

If the node R exists (step S903), as shown in FIG. 8, the node P (722) has a stable-state link to the node BS (720) via the node R (724) and the node 723. Thus, if the node P has been set in the set-F table 170 (step S909), the node P is deleted from the set-F table 170 (step S910).

If the node R does not exist (step S903), similarly to the case where the link between the node P and the node Q is a stable-state link (step S902), it is determined whether a link between the node Q and the node BS is a stable-state link (step S904). If the link between the node Q and the node BS is a stable-state link and if the link from the node Q to the node P becomes stable, the route of flooding to the node P is established. Thus, processing for selecting the node Q as an MPR (MPR selection processing A) is performed (step S908).

In contrast, if a link between the node Q and the node BS is an unstable-state link (step S904), the search for an alternative route therebetween is performed. This is shown in FIG. 9 and FIG. 10.

Figure 9:
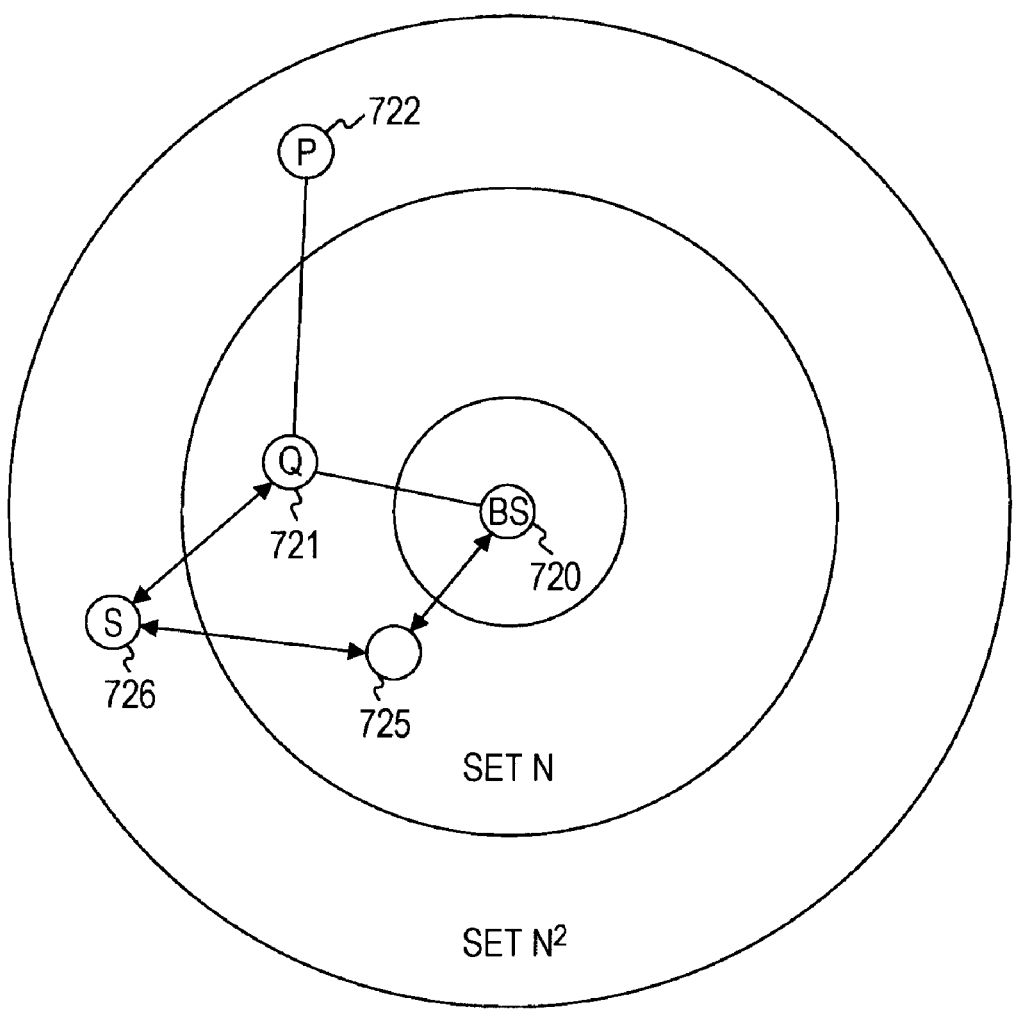
FIG. 9 is a diagram showing relationships between the nodes P and Q and a node S according to the embodiment of the present invention.

In FIG. 9, a node that belongs to the set $N^2$, has a stable-state link to the node Q (721) (the node being other than the node P), and has a stable-state link to a node (725) belonging to the set N is denoted as a node S (726). In a case where the node S like this exists (step S905), the route of flooding to the node P is established if the link from the node Q to the node P becomes stable. Thus, if the node P has been set in the set-F table 170 (step S909), the node P is deleted from the set-F table 170 (step S910). Here, in this case, since the link between the node Q and the node BS is in an unstable state, the node Q is not selected as an MPR at this moment.

Figure 10:
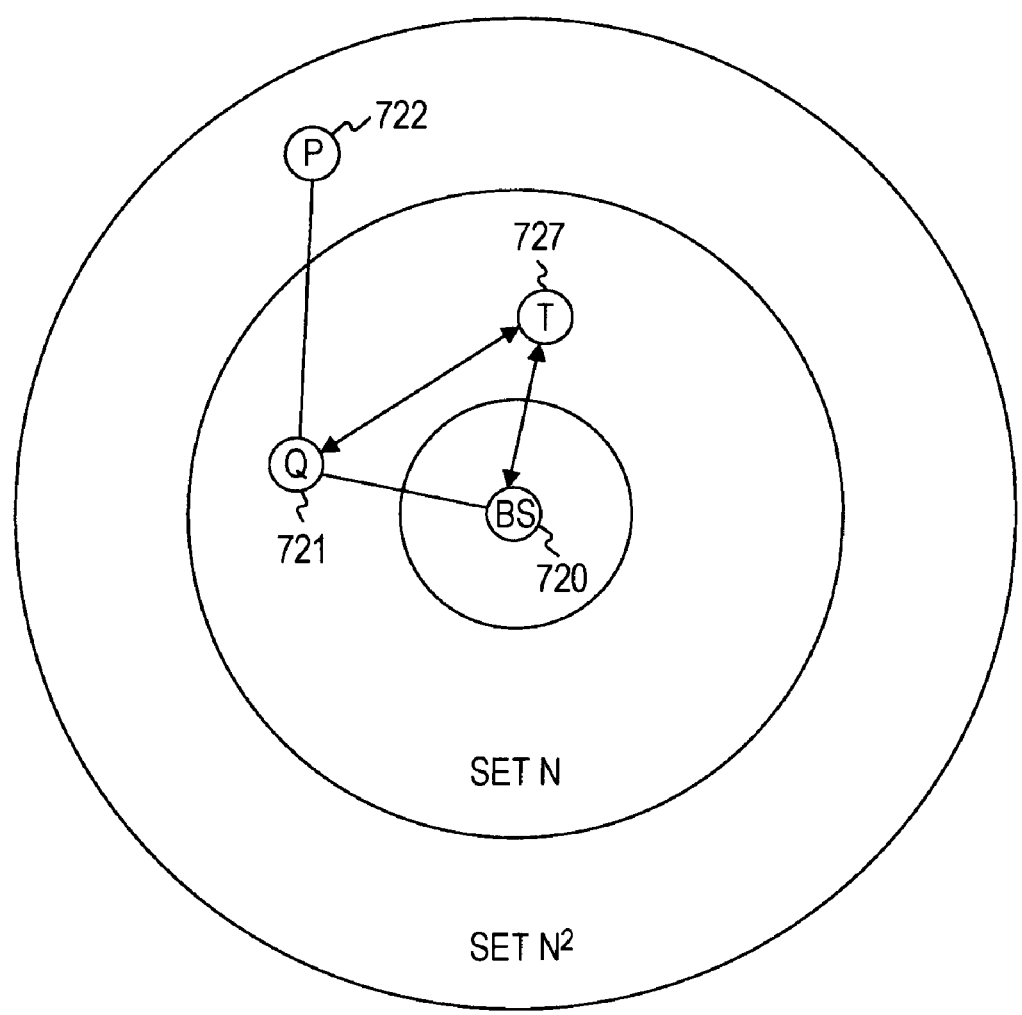
FIG. 10 is a diagram showing relationships between the nodes P and Q and a node T according to the embodiment of the present invention.

If the node S does not exist (step S905), as shown in FIG. 10, the search for, as a node T (727), a node that belongs to the set N, has a stable-state link to the node Q (721), and has a stable-state link to the node BS is performed. As a result, if the node T exists (step S906), processing for selecting the node T as an MPR (MPR selection processing A) is performed (step S907). In contrast, if the node T does not exist (step S906), processing for selecting the node Q as an MPR (MPR selection processing A) is performed (step S908).

If MPR selection processing A is performed in step S907 or S908, the route of flooding to the node P is established. Thus, if the node P has been set in the set-F table 170 (step S909), the node P is deleted from the set-F table 170 (step S910).

Figure 11:
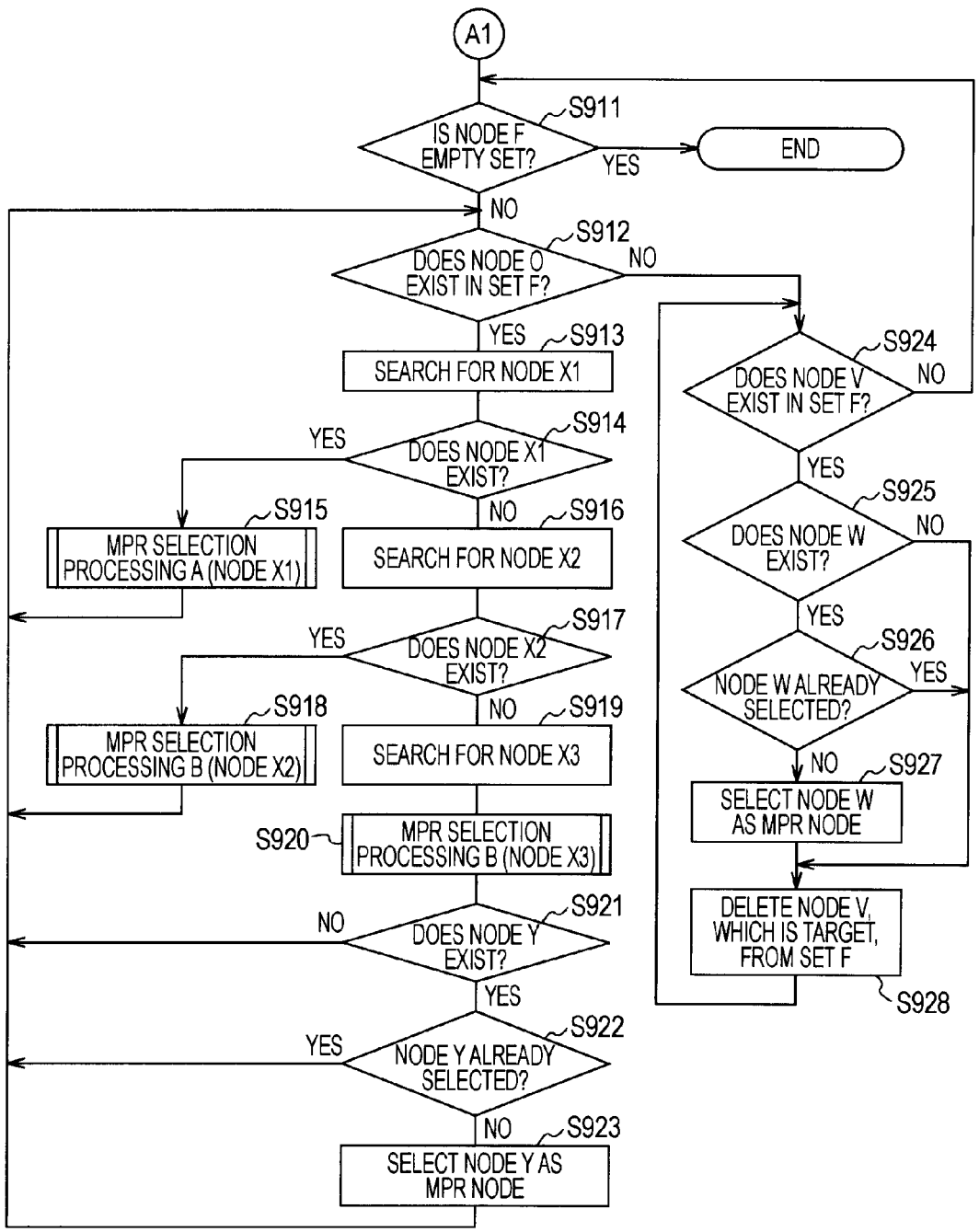
FIG. 11 is a diagram showing an exemplary processing procedure of the latter half of MPR setting processing in the wireless communication device 100 according to the embodiment of the present invention.

These processing processes are repeated, and when a node (the node P) having only one link to a node (the node Q) belonging to the set N becomes nonexistent in nodes corresponding to "set F ∩ set $N^2$", the latter half of processing shown in FIG. 11 will be performed.

FIG. 11 is a diagram showing an exemplary processing procedure of the latter half of MPR setting processing in the wireless communication device 100 according to the embodiment of the present invention. In the wireless communication device 100, the MPR setting unit 160 performs the following processing until the set F becomes an empty set, that is, until nodes set in the set-F table 170 become nonexistent (step S911).

First, if nodes (nodes O) corresponding to "set F ∩ set $N^2$" exist (step S912), the search for, as the node X1, a node having the largest number of stable-state links to the nodes O is performed among the nodes belonging to the set N and having a stable-state link to the node BS (step S913). This is shown in FIG. 13.

Figure 13:
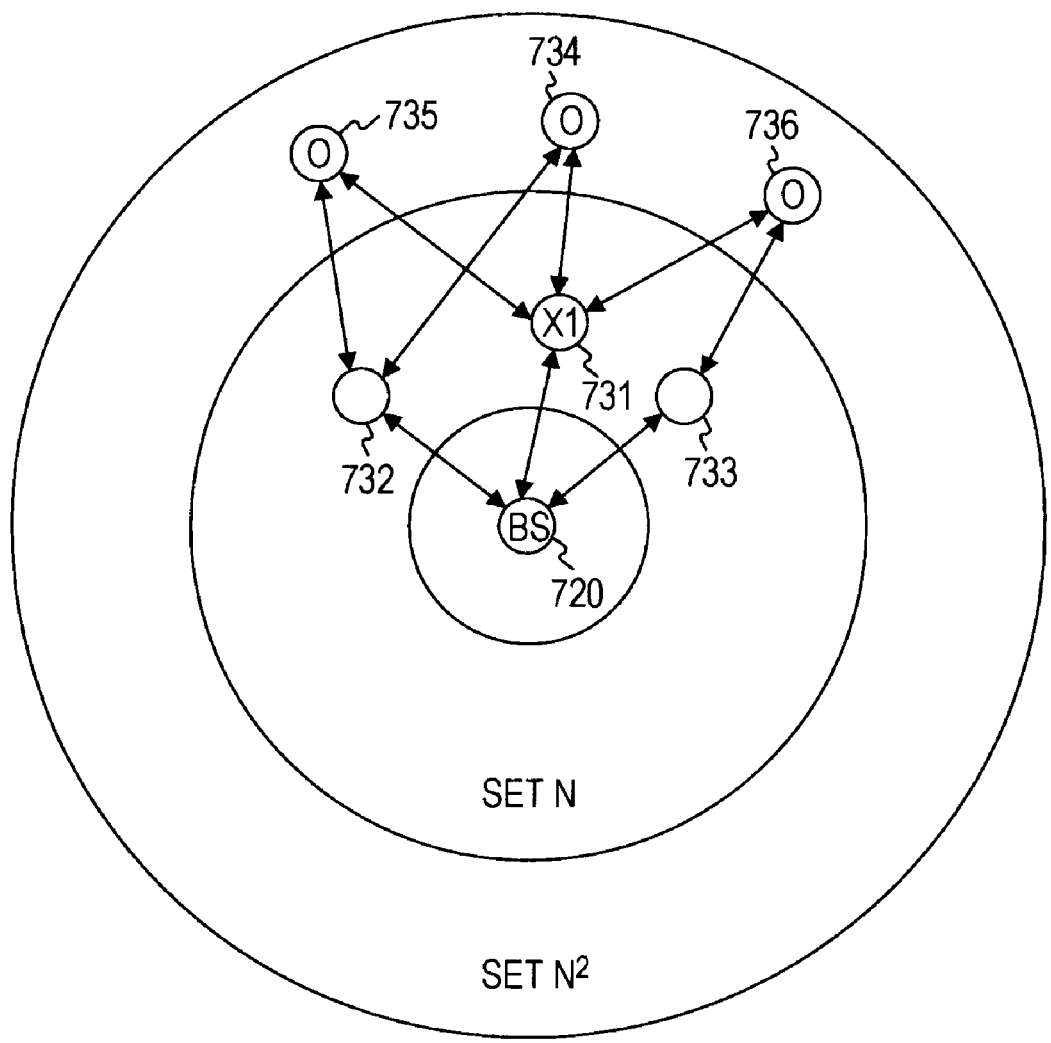
FIG. 13 is a diagram showing relationships between nodes O and a node X1 according to the embodiment of the present invention.

In FIG. 13, three nodes (731 through 733) having stable-state links to three nodes O (734 through 736) exist. Both of the nodes 732 and 733 have stable-state links to two of the nodes O. In contrast, the node 731 has stable-state links to the three nodes O. Thus, in this example, the search for the node 731 as the node X1 is performed.

If the node X1 like this exists (step S914), processing for selecting the node X1 as an MPR (MPR selection processing A) is performed (step S915). Here, if there are a plurality of nodes having the largest number of stable-state links to the nodes O, for example, a node that has a better link state in accordance with PER, RSSI, or the like can be selected as an MPR node. Moreover, in this case, a node may be randomly selected from the nodes.

If the node X1 does not exist (step S914), the search for, as a node X2, a node having the largest number of unstable-state links to the nodes O is performed among the nodes belonging to the set N and having a stable-state link to the node BS (step S916). This is shown in FIG. 14.

Figure 14:
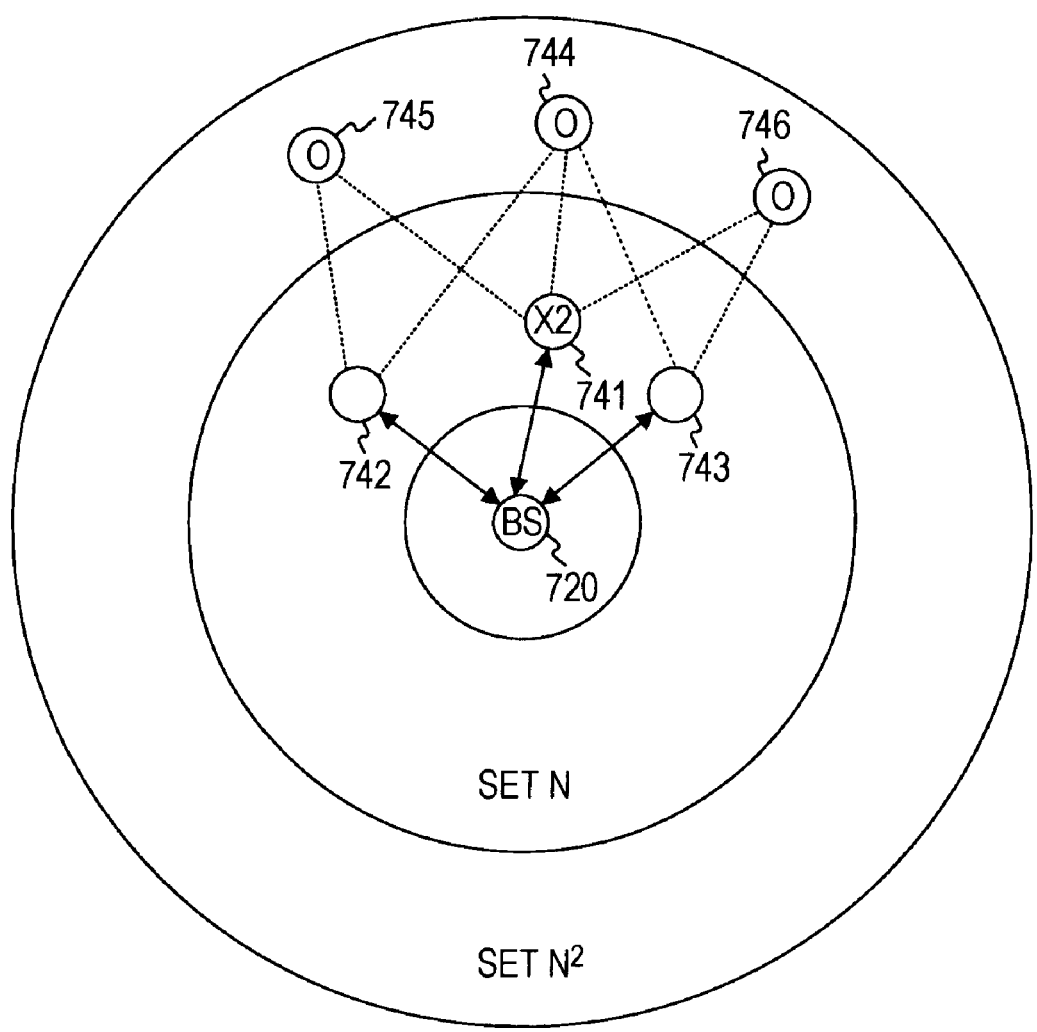
FIG. 14 is a diagram showing relationships between the nodes O and a node X2 according to the embodiment of the present invention.

In FIG. 14, three nodes (741 through 743) belonging to the set N and having unstable-state links to three nodes O through 746) exist. Both of the nodes 742 and 743 have unstable-state links to two of the nodes O. In contrast, the node 741 has unstable-state links to the three nodes O. Thus, in this example, the search for the node 741 as the node X2 is performed. Here, in the diagram, links indicated by broken lines mean unstable-state links. This is similarly applied to other diagrams.

If the node X2 like this exists (step S917), processing for selecting the node X2 as an MPR (MPR selection processing B) is performed (step S918). This MPR selection processing B differs from MPR selection processing A, and has a processing procedure shown in FIG. 12.

Figure 12:
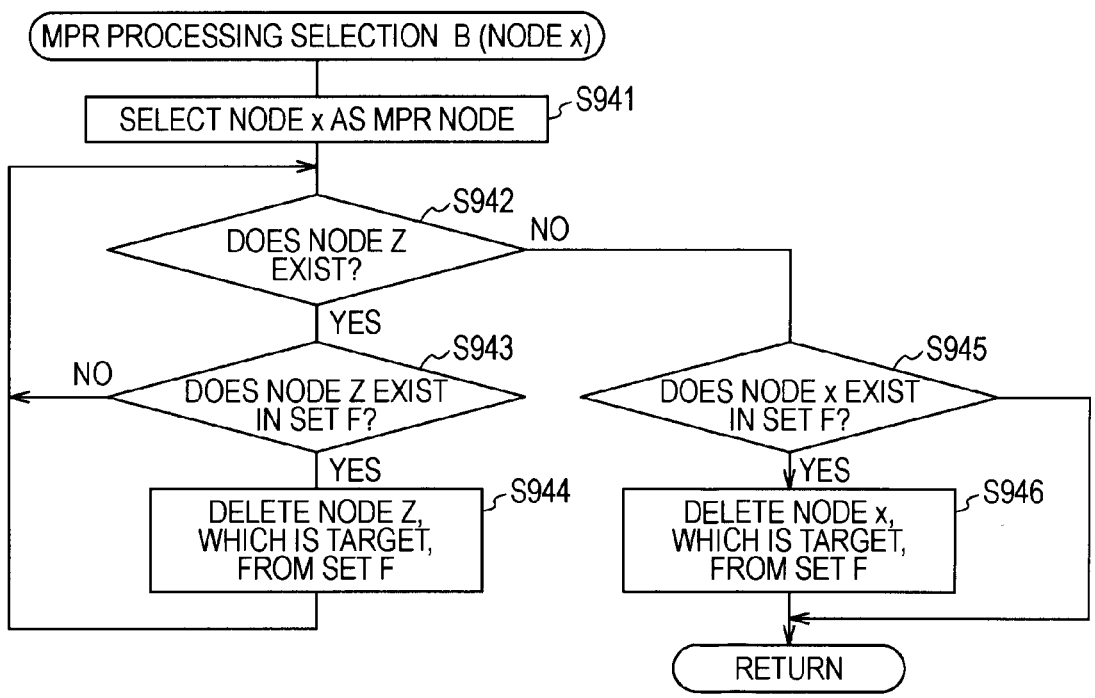
FIG. 12 is a diagram showing an exemplary processing procedure of MPR selection processing B according to the embodiment of the present invention.

FIG. 12 is a diagram showing an exemplary processing procedure of MPR selection processing B according to the embodiment of the present invention. This MPR selection processing B is a subroutine invoked from steps S918 and S920 in FIG. 11. A parameter used when this invoking is performed is denoted as the "node x". That is, the "node x" represents the "node X2" in a case where invoking is performed from step S918, and the "node x" represents a "node X3" in a case where invoking is performed from step S920.

In this MPR selection processing B, the node x is selected as an MPR and set in the MPR table 180 (step S941). Then, it is determined whether a node (a node Z) having a stable-state link or an unstable-state link to the node x exists in nodes corresponding to "set F ∩ set $N^2$" (step S942). In a case where the node Z exists, if the node Z has been set in the set-F table 170 (step S943), the node U is deleted from the set-F table 170 (step S944). Since there is a possibility that there are a plurality of nodes Z, steps S942 through S944 are repeatedly executed until no node Z exists. Thereafter, if the node x has been set in the set-F table 170 (step S945), the node x is deleted from the set-F table 170 (step S946).

Referring back to FIG. 11, if the node X2 does not exist (step S917), the search for, as the node X3, a node having the largest number of stable-state links or unstable-state links to the nodes O is performed among the nodes belonging to the set N and having an unstable-state link to the node BS (step S919). This is shown in FIG. 15.

Figure 15:
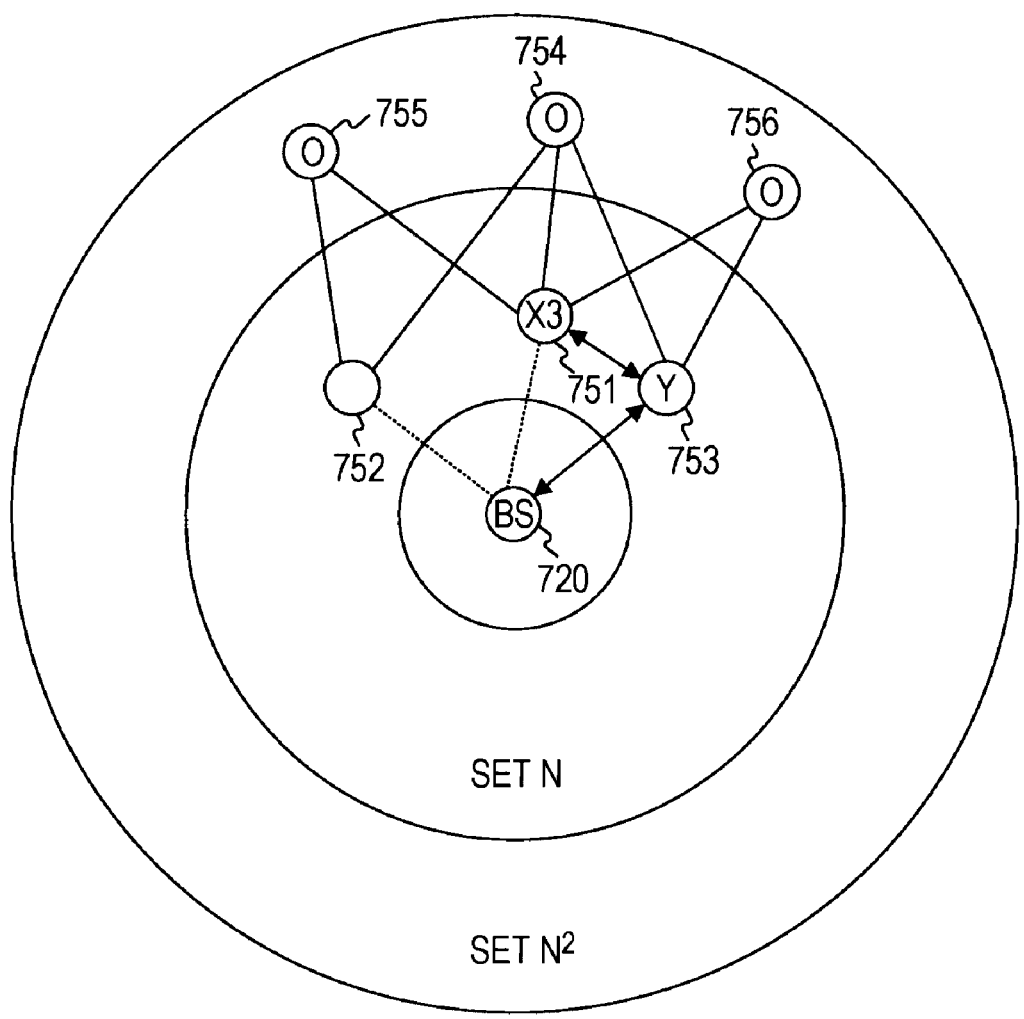
FIG. 15 is a diagram showing relationships between the nodes O and a node X3 according to the embodiment of the present invention.

In FIG. 15, three nodes (751 through 753) belonging to the set N and having unstable-state links to three nodes O through 756) exist. Both of the nodes 752 and 753 have unstable-state links to two of the nodes O. In contrast, the node 751 has unstable-state links to the three nodes O. Thus, in this example, the search for the node 751 as the node X3 is performed.

If the search for the node X3 like this is performed, processing for selecting the node X3 as an MPR (MPR selection processing B) is performed (step S920). The content of this MPR selection processing B is as described using FIG. 12. Thereafter, as in FIG. 15, in a case where a node (a node Y) that has a stable-state link to the node X3, belongs to the set N, and has a stable-state link to the node BS exists (step S921), if the node Y has not been selected as an MPR (step S922), the node Y is selected as an MPR node and set in the MPR table 180 (step S923).

Thereafter, processing processes in and after step S912 are repeated, and when the nodes O corresponding to "set F ∩ set $N^2$" become nonexistent (step S912), it is determined whether a node (a node V) corresponding to "set F ∩ set N" exists (step S924). If the node V does not exist, the procedure returns to step S911, and it is determined whether the set F is an empty set.

If the node V exists (step S924), it is determined whether a node (a node W) belonging to the set N and having a stable-state link to the node V exists (step S925). This is shown in FIG. 16.

Figure 16:
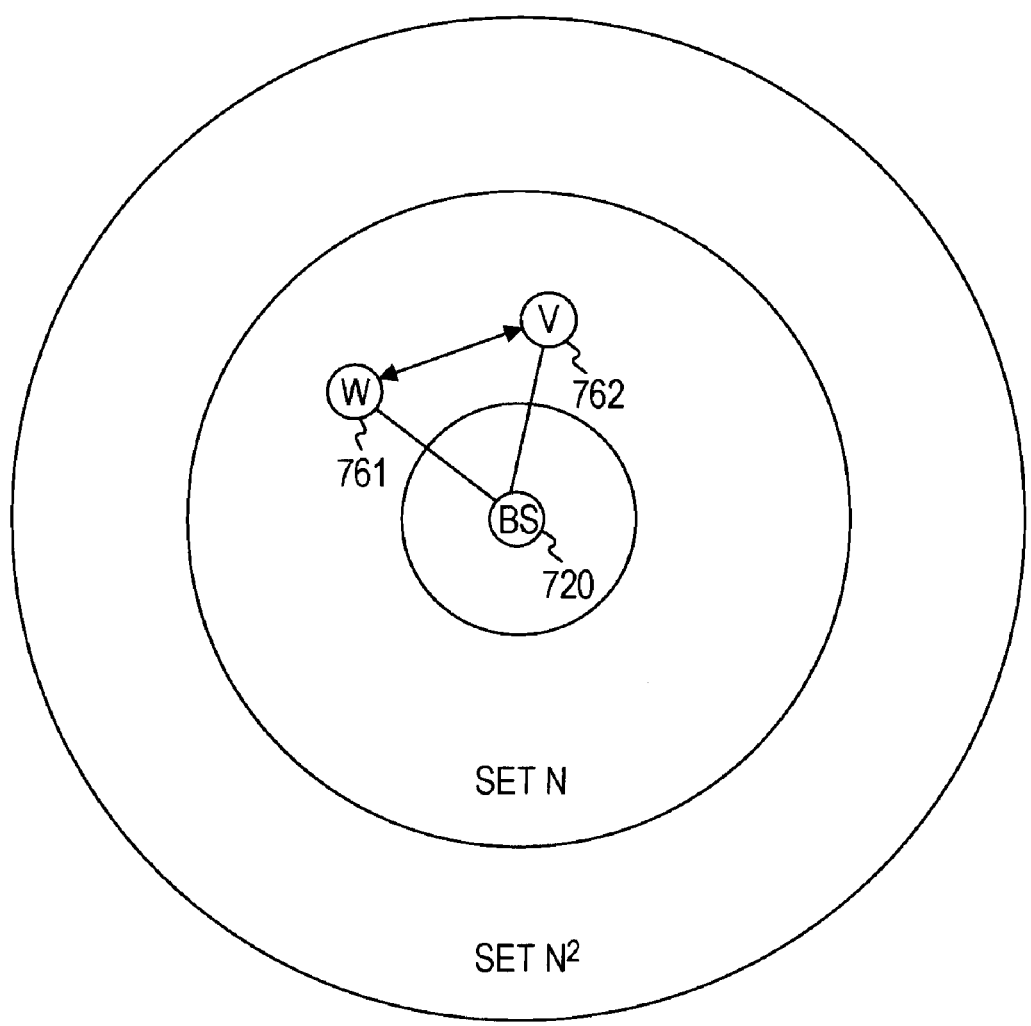
FIG. 16 is a diagram showing a relationship between a node V and a node W according to the embodiment of the present invention.

In FIG. 16, from the viewpoint of the node BS (720), a stable-state link exists between the node W (761) and the node V (762) that belong to the set N. The node V (762) has been set in the set F; however, the node W (761) may be or may not be set in the set F.

In a case where the node W exists (step S925), if the node W has not been selected as an MPR (step S926), the node W is selected as an MPR node and set in the MPR table 180 (step S927). Then, regardless of whether or not the node W exists, if the node V exists (step S924), the node V is deleted from the set-F table 170 (step S928). Thereafter, until no node V corresponding to the set N exists in the set-F table 170, processing processes in and after step S924 are repeated.

Next, an embodiment of processing according to an embodiment of the present invention will be described in accordance with specific examples.

FIG. 17 includes diagrams showing a first specific example according to the embodiment of the present invention. In this specific example, from the viewpoint of a node #A (811), there are two nodes belonging to the set N, a node #B (812) and a node #E (815), and there are two nodes belonging to the set $N^2$, a node #C (813) and a node #D (814). The link between the node #A (811) and the node #E (815) and the link between node #E (815) and the node #D (814) are in an unstable state. In this case, as an initial state of the set-F table 170, three nodes #C through E (813 through 815) are set.

In this case, the node #A (811) exists as the node BS, the node #D (814) exists as the node P, the node #E (815) exists as the node Q, and the node #C (813) exists as the node R, and the link between the node #E (815) and the node #D (814) is in an unstable state (steps S902 through S903 in FIG. 5). Thus, the node #D (814) is deleted from the set-F table 170 (step S910 in FIG. 5).

Thereafter, the search for the node #C (813) as the node O and the search for the node #B (812) as the node X1 are performed (step S913 in FIG. 11). Thus, the node #B (812) is selected as an MPR (step S915 in FIG. 11) and deleted from the set-F table 170 (step S946 in FIG. 12).

Finally, the search for the node #E (815) as the node V and the search for the node #B (812) as the node W are performed. Thus, the node #E (815) is deleted from the set-F table 170 (step S928 in FIG. 11). Accordingly, the set F becomes an empty set and the processing ends.

In this way, in the first specific example, the node #B (812) is selected as an MPR.

FIG. 18 includes diagrams showing a second specific example according to the embodiment of the present invention. In this second specific example, from the viewpoint of a node #A (821), the nodes belonging to the set N and the nodes belonging to the set $N^2$ are similar to those in the first specific example. Here, the second specific example differs from the first specific example in that no link exists between a node #C (823) and a node #D (824). The second specific example is similar to the first specific example in that three nodes #C through E (823 through 825) are set as an initial state of the set-F table 170.

In this case, the node #A (821) exists as the node BS, the node #D (824) exists as the node P, and the node #E (825) exists as the node Q, and the node R does not exist. Thus, the node #C (823) becomes the node S (step S905 in FIG. 5). As a result, the node #D (824) is deleted from the set-F table 170 (step S910 in FIG. 5).

Thereafter, the search for the node #C (823) as the node O and the search for a node #B (822) as the node X1 are performed (step S913 in FIG. 11). Thus, the node #B (822) is selected as an MPR (step S915 in FIG. 11) and deleted from the set-F table 170 (step S946 in FIG. 12).

Finally, the search for the node #E (825) as the node V and the search for the node #B (822) as the node W are performed. Thus, the node #E (825) is deleted from the set-F table 170 (step S928 in FIG. 11). Accordingly, the set F becomes an empty set and the processing ends.

In this way, in the second specific example, the node #B (822) is selected as an MPR.

FIG. 19 includes diagrams showing a third specific example according to the embodiment of the present invention. In this third specific example, from the viewpoint of a node #A (831), the nodes belonging to the set N and the nodes belonging to the set $N^2$ are similar to those in the first specific example. Here, the third specific example differs from the first specific example in that no link exists between a node #B (832) and a node #C (833) and between the node #B (832) and a node #E (835). The third specific example is similar to the first specific example in that three nodes #C through E (833 through 835) are set as an initial state of the set-F table 170.

In this case, the node #A (831) exists as the node BS, the node #C and a node #D (833 and 834) exist as the node P and the node #E (835) exists as the node Q. First, in a case where the node #D (834) is treated as the node P, the link between the node #D (834) and the node #E (835) and the link between the node #A (831) and the node #E (835) are in an unstable state, and the node R, the node S, and the node T do not exist. Thus, the node #E (835) is selected as an MPR (step S908 in FIG. 5) and the node #C (833) is deleted from the set-F table 170 (step S935 in FIG. 6).

Next, in a case where the node #C (833) is treated as the node P, the link between the node #A (831) and the node #E (835) is in an unstable state, and furthermore neither the node S nor the node T exists. Thus, the node #E (835) becomes a candidate for an MPR (step S908 in FIG. 5); however, the node #E (835) has already been selected as an MPR, and thus redundant processing is not performed (step S931 in FIG. 6) and the node #C (833) is deleted from the set-F table 170 (step S935 in FIG. 6).

Finally, although the node #E (835) is left in the set-F table 170, since the node W does not exist, the node #E (835) is deleted from the set-F table 170 (step S928 in FIG. 11). Accordingly, the set F becomes an empty set and the processing ends.

In this way, in the third specific example, the node #E (835) is selected as an MPR.

Figure 20:
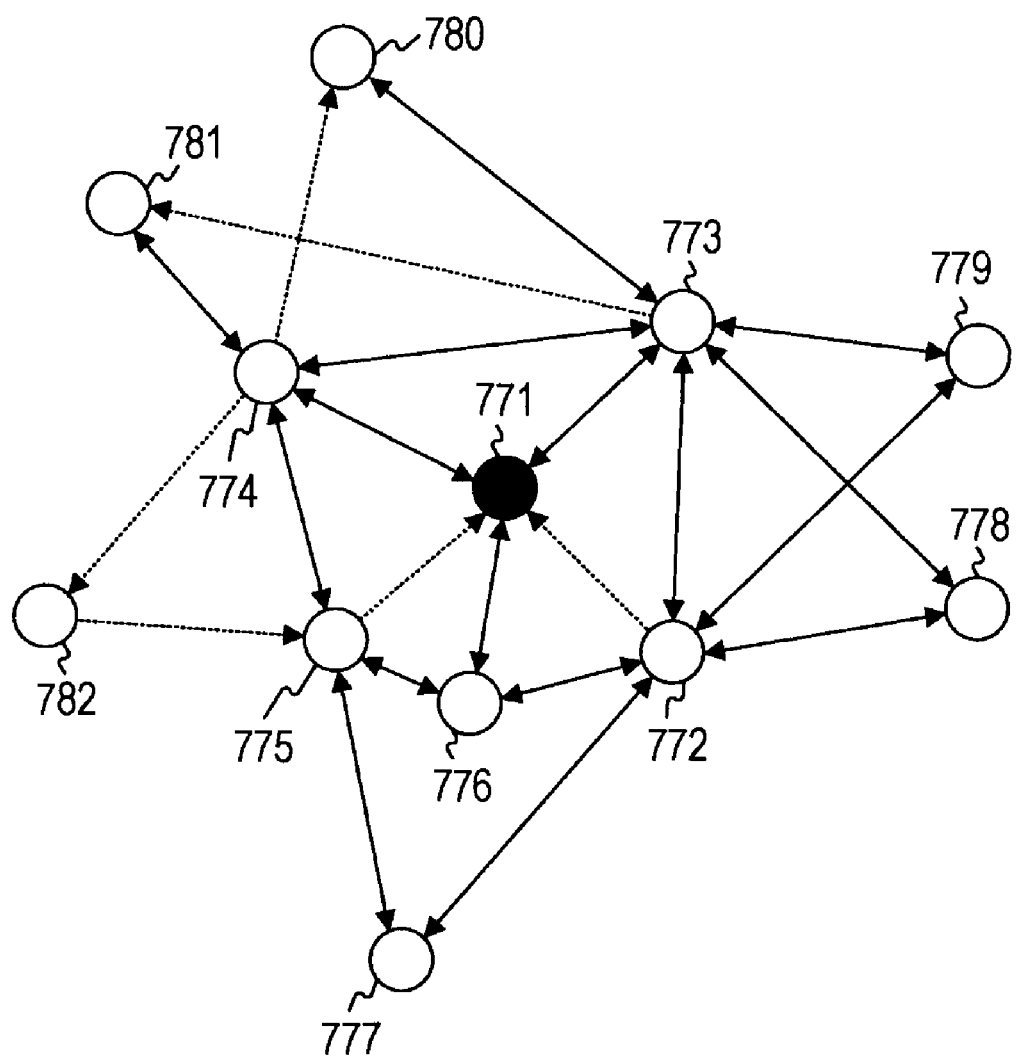
FIG. 20 is a diagram showing a fourth specific example according to the embodiment of the present invention.

FIGS. 20 through 25 are diagrams showing a fourth specific example according to the embodiment of the present invention. As shown in FIG. 20, in this specific example, nodes #B through #L (772 through 782) exist around a node #A (771). From the viewpoint of the node #A (771), there are five nodes belonging to the set N, the nodes #B through #F (772 through 776), and there are six nodes belonging to the set $N^2$, the nodes #G through #L (777 through 782). Among the nodes belonging to the set N, the nodes #B and #E (772 and 775) have an unstable-state link to the node #A (771). Thus, a total of eight nodes #G through #L (777 through 782) and #B and #E (772 and 775) are originally set in the set-F table 170.

Figure 21:
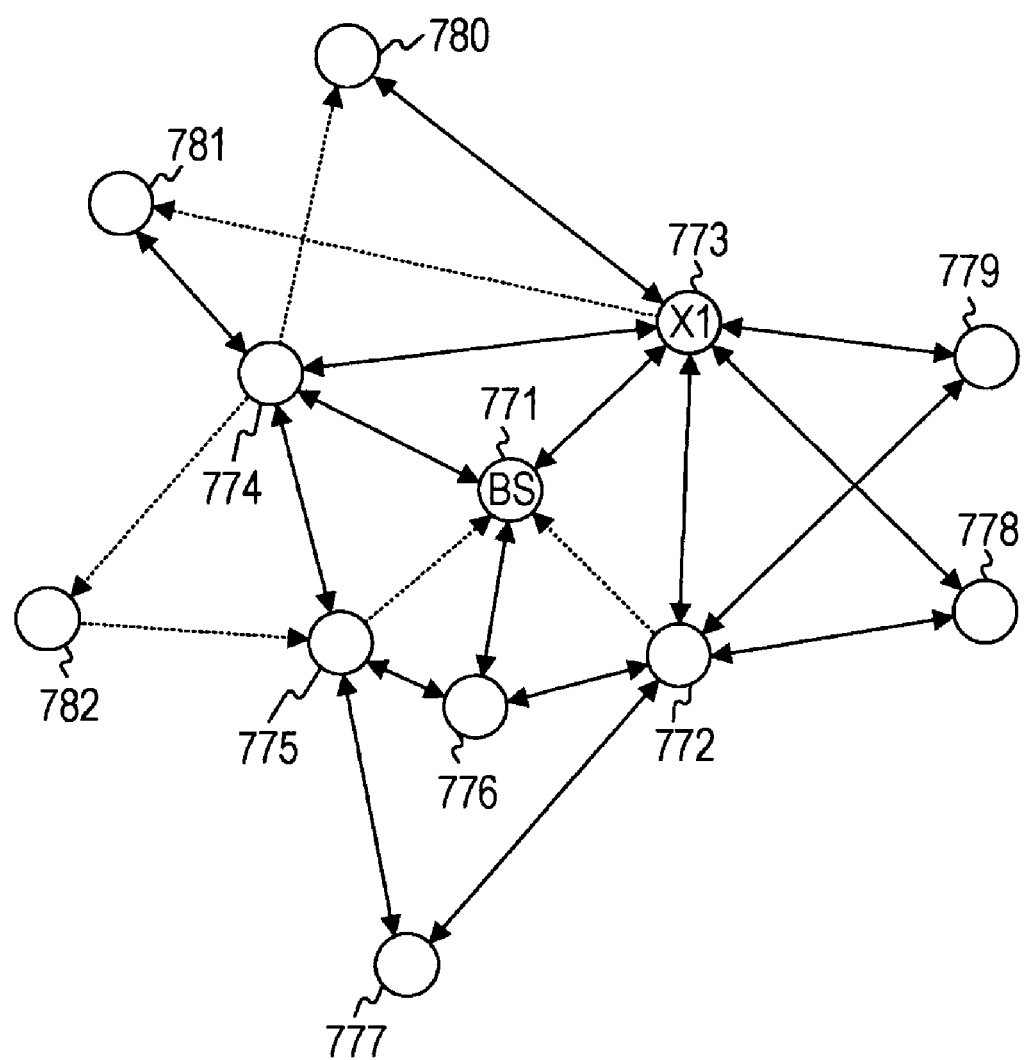
FIG. 21 is a diagram showing the fourth specific example according to the embodiment of the present invention.

In this fourth specific example, the nodes belonging to the set $N^2$ have links to two of the nodes in the set N, and the node Q corresponding to the node P does not exist (step S901 in FIG. 5). Thus, the search for the node X1 is performed (step S913 in FIG. 6). As a result, as shown in FIG. 21, the node #C (773) becomes the node X1 and is selected as an MPR (step S915 in FIG. 11). Accordingly, as the node U, the nodes #H, #I, and #J (778, 779, and 780) are deleted from the set-F table 170 (step S935 in FIG. 6).

Figure 22:
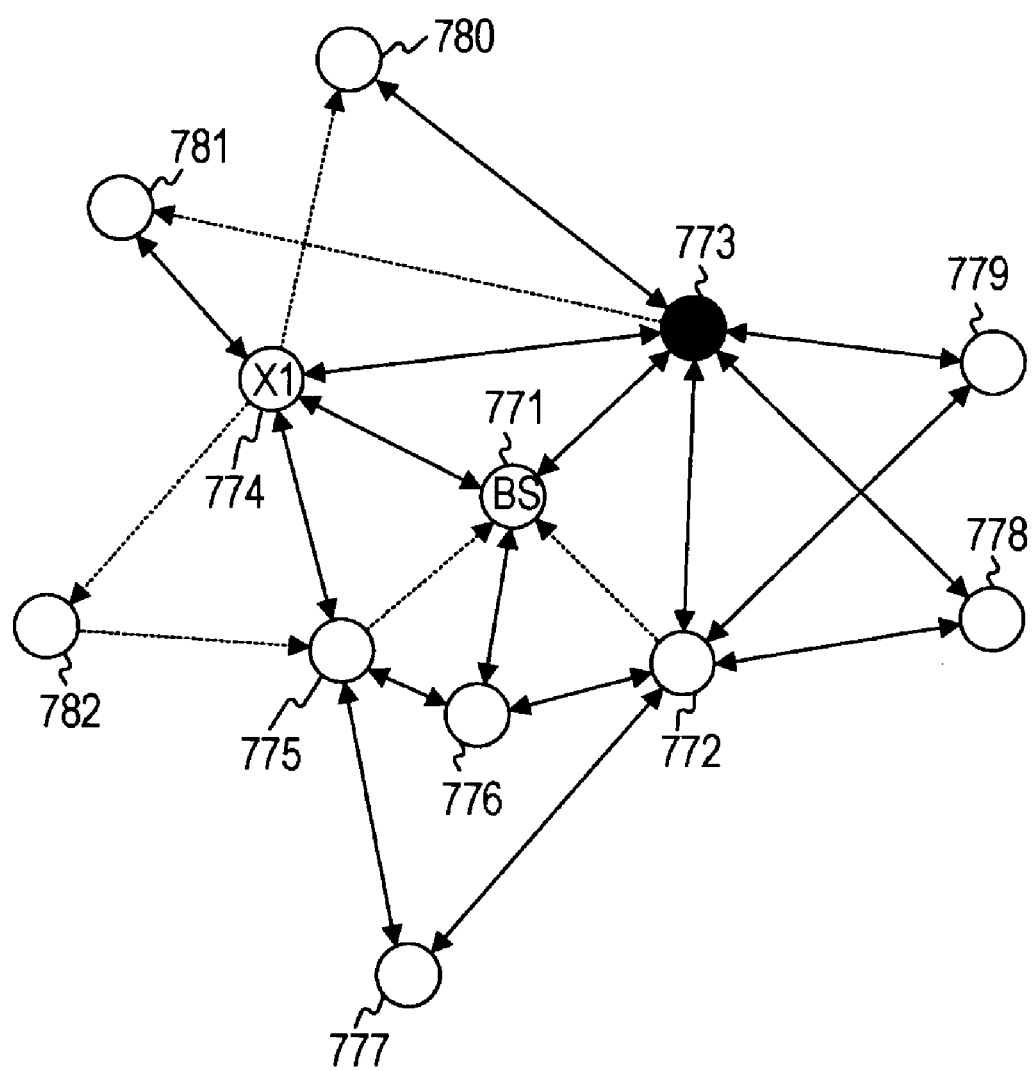
FIG. 22 is a diagram showing the fourth specific example according to the embodiment of the present invention.

Subsequently, since the set F is not an empty set, the search for the node X1 is further performed (step S913 in FIG. 6). As a result, as shown in FIG. 22, the node #D (774) becomes the node X1 and is selected as an MPR (step S915 in FIG. 11). Accordingly, as the node U, the node #K (781) is deleted from the set-F table 170 (step S935 in FIG. 6).

Figure 23:
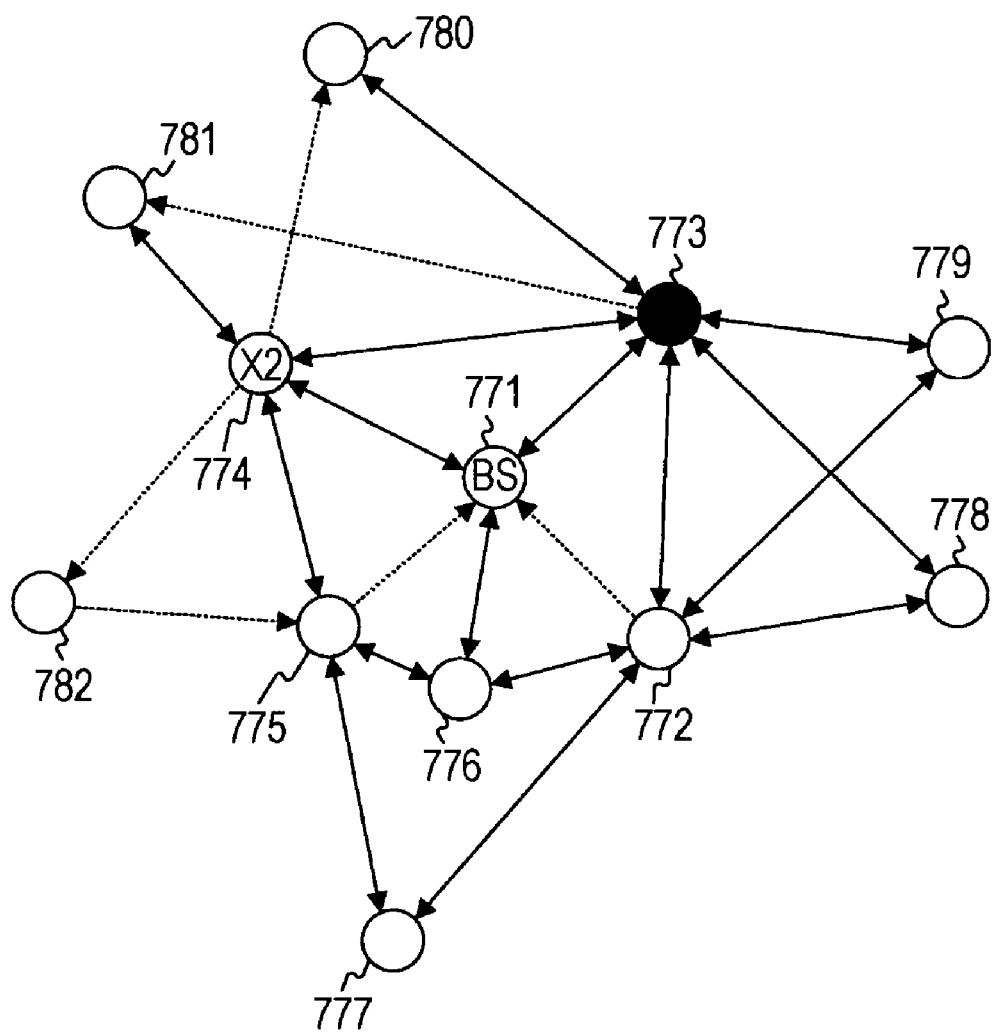
FIG. 23 is a diagram showing the fourth specific example according to the embodiment of the present invention.

Next, since the node X1 does not exist, the search for the node X2 is performed (step S916 in FIG. 6). As a result, as shown in FIG. 23, the node #D (774) becomes the node X2 and is selected as an MPR (step S918 in FIG. 11). Accordingly, as the node Z, the node #L (782) is deleted from the set-F table 170 (step S944 in FIG. 12).

Figure 24:
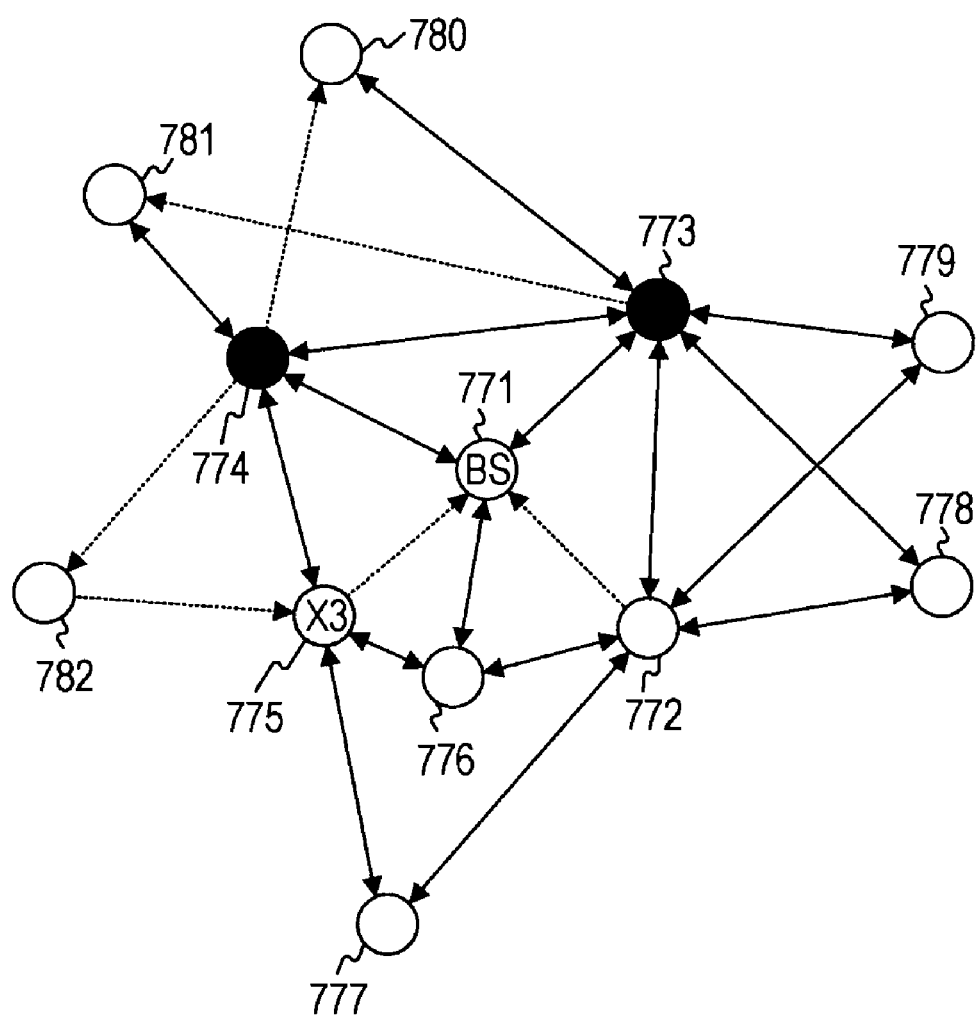
FIG. 24 is a diagram showing the fourth specific example according to the embodiment of the present invention.

Next, since the node X2 does not exist, the search for the node X3 is performed (step S919 in FIG. 6). In this case, two nodes #B and #E (772 and 775) become candidates for the node X3. For example, as shown in FIG. 24, the node #E (775) is treated as the node X3. As a result, the node #E (775) is selected as an MPR (step S920 in FIG. 11). Accordingly, as the node Z, the node #G (777) is deleted from the set-F table 170 (step S944 in FIG. 12) and the node #E (775) is also deleted from the set-F table 170 (step S946 in FIG. 12).

Finally, the node #B (772), which is left in the set-F table 170, becomes the node V, and the node #C (773) becomes the node W. However, the node #C (773) has already been selected as an MPR (step S926 in FIG. 11), and thus MPR selection is not performed and the node #B (772) is deleted from the set-F table 170 (step S928 in FIG. 11). Accordingly, the set F becomes an empty set and the processing ends.

Figure 25:
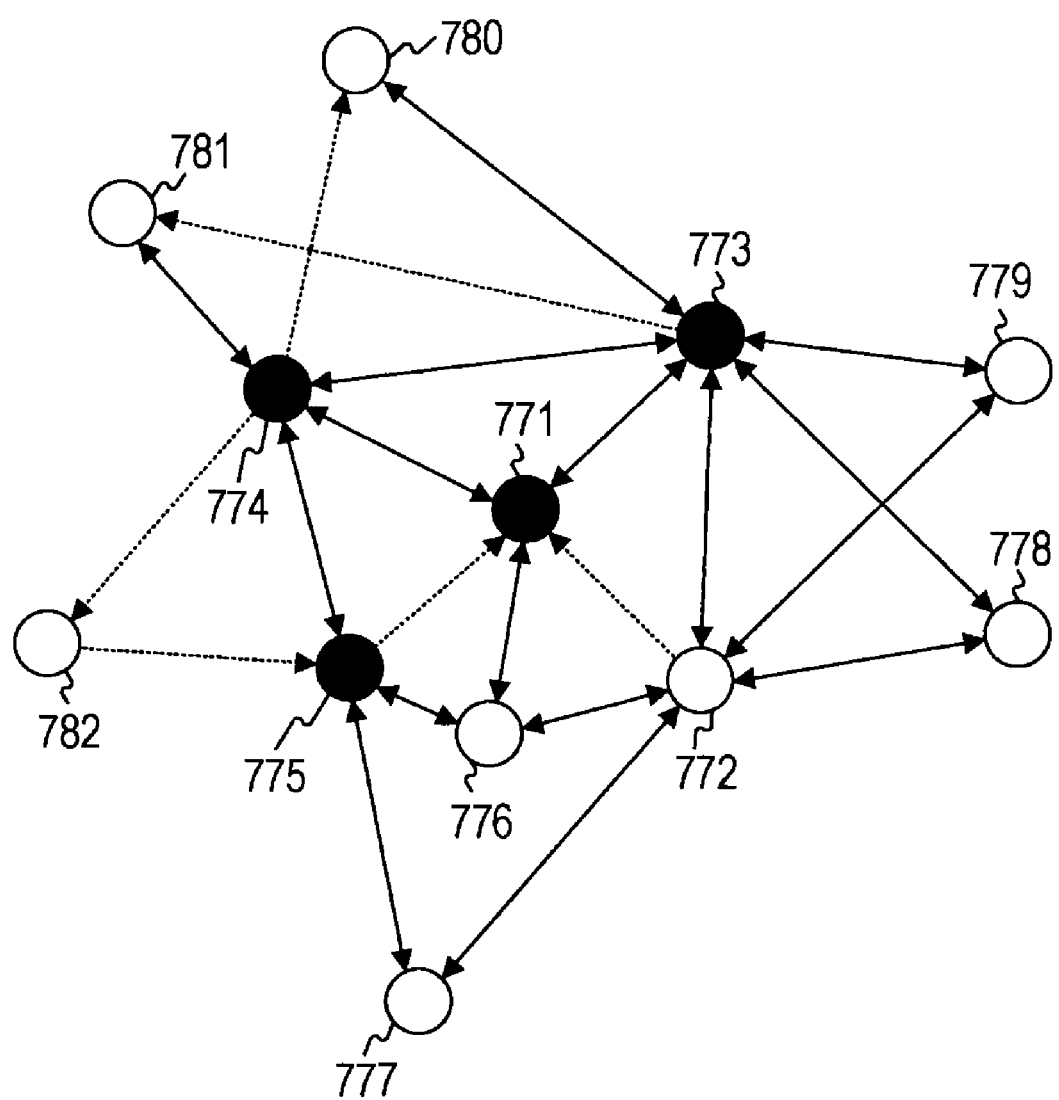
FIG. 25 is a diagram showing the fourth specific example according to the embodiment of the present invention.

In this way, in the fourth specific example, as shown in FIG. 25, the three nodes #C through #E (773 through 735) are selected as MPRs.

In this way, in the embodiments of the present invention, with consideration of communication states of links between nodes belonging to either of sets N and $N^2$, the MPR setting unit 160 sets MPR nodes in the MPR table 180. Thus, flooding can be performed using more stable links in accordance with communication states of links, whereby the reliability can be improved. Moreover, with additional consideration of links whose communication state is unstable, in a case where a communication state changes and communication is enabled, the reachable area of flooding can be widened.

Here, the embodiments of the present invention are illustrated as examples of a way to realize the present invention. Although there is a correspondence between the embodiments and the features of the claims, which will be described below, the present invention is not limited thereto, and various modifications can be made within the scope that does not depart from the gist of the present invention.

That is, in Claim 1 or 7, unidentified-device identification-information holding means corresponds to, for example, the set-F table 170. Moreover, relay-device identification-information holding means corresponds to, for example, the MPR table 180. Moreover, relay-device setting means corresponds to, for example, the MPR setting unit 160. Moreover, first destination stations correspond to, for example, wireless communication devices belonging to the set N. Moreover, second destination stations correspond to, for example, wireless communication devices belonging to the set N.

Moreover, in Claim 2, a specific first destination station corresponds to, for example, the node Q. Moreover a specific second destination station corresponds to, for example, the node P.

Moreover, in Claim 4, a specific first destination station corresponds to, for example, the node X1, X2, or X3. Moreover, a specific second destination station corresponds to, for example, the node O.

Moreover, in Claim 5 or 8, unidentified-device identification-information holding means corresponds to, for example, the set-F table 170. Moreover, relay-device identification-information holding means corresponds to, for example, the MPR table 180. Moreover, relay-device setting means corresponds to, for example, the MPR setting unit 160. Moreover, another wireless communication device corresponds to, for example, a wireless communication device belonging to the set N.

Moreover, in Claim 6, an unidentified device corresponds to, for example, the node V. Moreover, another wireless communication device corresponds to, for example, the node W.

Moreover, in Claim 9 or 11, unidentified-device identification-information holding means corresponds to, for example, the set-F table 170. Moreover, relay-device identification-information holding means corresponds to, for example, the MPR table 180. Moreover, first destination stations correspond to, for example, wireless communication devices belonging to the set N. Moreover, second destination stations correspond to, for example, wireless communication devices belonging to the set $N^2$. Moreover, a selection process corresponds to, for example, step S932 or S941. Moreover, a deletion process corresponds to, for example, step S935 or S944.

Moreover, in Claim 10 or 12, unidentified-device identification-information holding means corresponds to, for example, the set-F table 170. Moreover, relay-device identification-information holding means corresponds to, for example, the MPR table 180. Moreover, a selection process corresponds to, for example, step S927. Moreover, a deletion process corresponds to, for example, step S928.

Here, a processing procedure described in the embodiments of the present invention may be considered as a method having these series of processes or may be considered as a program that causes a computer to execute these series of processes or a recording medium having a program stored thereon.

The invention claimed is:

1. A wireless communication device that performs communication, in a route via a neighbor wireless communication device, with another wireless communication device that exists outside a wireless communication range of the wireless communication device, comprising:
    an antenna;
    a set-F table for holding, as unidentified-device identification information, information used to identify an unidentified device that is another wireless communication device to which the reachability of a signal transmitted by the antenna has not been verified;
    a Multi-Point Relay (MPR) table for holding information used to identify a relay device that is another wireless communication device that relays a signal transmitted by the antenna; and
    a MPR setting unit for treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, holding information used to identify the selected relay device in the MPR table, and deleting information used to identify a wireless communication device whose reachability has been verified via the selected relay device from the set-F table, until the unidentified-device identification information held in the set-F table becomes nonexistent.

2. The wireless communication device according to claim 1,
    wherein in a case where a specific second destination station having only one link to one of the first destination stations exists in the second destination stations whose unidentified-device identification information is held in the set-F table, if both a communication state between the specific first destination station and the wireless communication device and a communication state between the specific first destination station and the specific second destination station are stable states, the MPR setting unit selects the specific first destination address as the relay device.

3. The wireless communication device according to claim 2,
wherein in a case where a specific second destination station having only one link to one of the first destination stations exists in the second destination stations whose unidentified-device identification information is held in the set-F table, when at least either a communication state between the first destination station and the wireless communication device or a communication state between the specific first station and the specific second destination station is an unstable state, if there exists a first destination station which is other than the specific first destination station and whose communication state with the wireless communication device is a stable state, the MPR setting unit selects such a first destination station as the relay device, and if such a first destination station does not exist, the MPR setting unit selects the specific first destination station as the relay device.

4. The wireless communication device according to claim 1,
wherein, in a case where no specific second destination station having only one link to one of the first destination stations exists in the second destination stations whose unidentified-device identification information is held in the set-F table, the MPR setting unit selects a first destination station that is more stable and that has a large number of links as the relay device, in accordance with communication states and the number of links between the second destination stations whose unidentified-device identification information is held in the set-F table and the first destination stations and communication states between the first destination stations and the wireless communication device.

5. A wireless communication device that performs communication, in a route via a neighbor wireless communication device, with another wireless communication device that exists outside a wireless communication range of the wireless communication device, comprising:
an antenna;
a set-F table for holding, as unidentified-device identification information, information used to identify an unidentified device that is another wireless communication device that exists within a wireless communication range to which the reachability of a signal transmitted by the antenna has not been verified;
a Multi-Point Relay (MPR) table for holding information used to identify a relay device that is another wireless communication device that relays a signal transmitted by the antenna; and
a MPR setting unit for selecting the relay device in accordance with a communication state between the wireless communication device and the other wireless communication device, holding information used to identify the selected relay device in the set-F table, and deleting information used to identify a wireless communication device whose reachability has been verified via the selected relay device from the set-F table, until the unidentified-device identification information held in the set-F table becomes nonexistent.

6. The wireless communication device according to claim 5,
wherein in a case where there exists the other wireless communication device whose communication state with the unidentified device whose unidentified-device identification information is held in the set-F table is a stable state, the MPR setting unit selects the other wireless communication device as the relay device.

7. A wireless communication system in which wireless communication devices each perform communication, in a route via a neighbor wireless communication device, with another wireless communication device that exists outside a wireless communication range of the wireless communication device, comprising:
each of the wireless communication devices including an antenna and a set-F table directed to holding, as unidentified-device identification information, information used to identify an unidentified device that is another wireless communication device to which the reachability of a signal transmitted by the antenna has not been verified;
a Multi-Point Relay (MPR) table for holding information used to identify a relay device that is another wireless communication device that relays a signal transmitted by the antenna; and
a MPR setting unit for treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, holding information used to identify the selected relay device in the MPR table, and deleting information used to identify a wireless communication device whose reachability has been verified via the selected relay device from the set-F table, until the unidentified-device identification information held in the set-F table becomes nonexistent.

8. A wireless communication system in which wireless communication devices each perform communication, in a route via a neighbor wireless communication device, with another wireless communication device that exists outside a wireless communication range of the wireless communication device, comprising:
each of the wireless communication devices including an antenna and a set-F table for holding, as unidentified-device identification information, information used to identify an unidentified device that is another wireless communication device that exists within a wireless communication range to which the reachability of a signal transmitted by the antenna has not been verified;
a MPR table for holding information used to identify a relay device that is another wireless communication device that relays a signal whose transmission source is the wireless communication device; and
a MPR setting unit for selecting the relay device in accordance with a communication state between the wireless communication device and the other wireless communication device, holding information used to identify the selected relay device in the MPR table, and deleting information used to identify a wireless communication device whose reachability has been verified via the selected relay device from the set-F table, until the unidentified-device identification information held in the set-F table becomes nonexistent.

9. A wireless communication method in a wireless communication device that is one of wireless communication devices each performing communication, in a route via a neighbor wireless communication device, with another wireless communication device that exists outside a wireless communication range of the wireless communication device and including unidentified-device identification-information holding means for holding, as unidentified-device identification information, information used to identify an unidentified device that is another wireless communication device to which the reachability of a signal whose transmission source is the wireless communication device has not been verified and relay-device identification-information holding means for holding information used to identify a relay device that is another wireless communication device that relays a signal whose transmission source is the wireless communication device, characterized by comprising:
- a selection process of treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, and holding information used to identify the selected relay device in the relay device identification-information holding means; and
- a deletion process of deleting information used to identify a wireless communication device whose reachability has been verified via the selected relay device from the unidentified-device identification-information holding means, wherein the selection process and the deletion process are repeated until the unidentified-device identification information held in the unidentified-device identification-information holding means becomes nonexistent.

10. A wireless communication method in a wireless communication device that is one of wireless communication devices each performing communication, in a route via a neighbor wireless communication device, with another wireless communication device that exists outside a wireless communication range of the wireless communication device and including unidentified-device identification-information holding means for holding, as unidentified-device identification information, information used to identify an unidentified device that is another wireless communication device to which the reachability of a signal whose transmission source is the wireless communication device has not been verified and relay-device identification information holding means for holding information used to identify a relay device that is another wireless communication device that relays a signal whose transmission source is the wireless communication device, characterized by comprising:
- a selection process of selecting the relay device in accordance with a communication state between the wireless communication device and the other wireless communication device and holding information used to identify the selected relay device in the relay-device identification-information holding means; and
- a deletion process of deleting information used to identify a wireless communication device whose reachability has been verified via the selected relay device from the unidentified-device identification-information holding means, wherein the selection process and the deletion process are repeated until the unidentified-device identification information held in the unidentified-device identification information holding means becomes nonexistent.

11. A non-transitory computer readable medium storing instructions for causing a computer to perform operations in a wireless communication device that is one of wireless communication devices each performing communication, in a route via a neighbor wireless communication device, with another wireless communication device that exists outside a wireless communication range of the wireless communication device and including a set-F table for holding, as unidentified-device identification information, information used to identify an unidentified device that is another wireless communication device to which the reachability of a signal whose transmission source is the wireless communication device has not been verified and a Multi-Point Relay (MPR) table for holding information used to identify a relay device that is another wireless communication device that relays a signal whose transmission source is the wireless communication device, comprising:
- a selection process of treating, as first destination stations, other wireless communication devices that exist within a wireless communication range of the wireless communication device, treating, as second destination stations, other wireless communication devices that exist outside the wireless communication range of the wireless communication device and within wireless communication ranges of the first destination stations, selecting at least one of the first destination stations as the relay device in accordance with communication states between the wireless communication device and the first destination stations and communication states between the first destination stations and the second destination stations, and holding information used to identify the selected relay device in the MPR table; and
- a deletion process of deleting information used to identify a wireless communication device whose reachability has been verified via the selected relay device from the set-F table, until the unidentified-device identification information held in the set-F table becomes nonexistent.

12. A non-transitory computer readable medium storing instructions for causing a computer to perform operations in a wireless communication device that is one of wireless communication devices each performing communication, in a route via a neighbor wireless communication device, with another wireless communication device that exists outside a wireless communication range of the wireless communication device and including a set-F table for holding, as unidentified-device identification information, information used to identify an unidentified device that is another wireless communication device to which the reachability of a signal whose transmission source is the wireless communication device has not been verified and a Multi-Point Relay (MPR) table for holding information used to identify a relay device that is another wireless communication device that relays a signal whose transmission source is the wireless communication device, comprising:
- a selection process of selecting the relay device in accordance with a communication state between the wireless communication device and the other wireless communication device and holding information used to identify the selected relay device in the MPR table; and
- a deletion process of deleting information used to identify a wireless communication device whose reachability has been verified via the selected relay device from the set-F table, until the unidentified-device identification information held in the set-F table becomes nonexistent.

* * * * *